US009408011B2

(12) United States Patent
Kim et al.

(10) Patent No.: US 9,408,011 B2
(45) Date of Patent: Aug. 2, 2016

(54) AUTOMATED USER/SENSOR LOCATION RECOGNITION TO CUSTOMIZE AUDIO PERFORMANCE IN A DISTRIBUTED MULTI-SENSOR ENVIRONMENT

(75) Inventors: Lae-Hoon Kim, San Diego, CA (US); Pei Xiang, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 939 days.

(21) Appl. No.: 13/476,815

(22) Filed: May 21, 2012

(65) Prior Publication Data
US 2013/0156198 A1 Jun. 20, 2013

Related U.S. Application Data

(60) Provisional application No. 61/577,483, filed on Dec. 19, 2011.

(51) Int. Cl.
| H04R 29/00 | (2006.01) |
| H04S 7/00 | (2006.01) |
| H04R 1/32 | (2006.01) |
| H04R 3/12 | (2006.01) |

(52) U.S. Cl.
CPC ............... *H04S 7/302* (2013.01); *H04R 1/323* (2013.01); *H04R 3/12* (2013.01); *H04S 7/301* (2013.01)

(58) Field of Classification Search
CPC .......... H04S 7/301; H04S 7/302; H04S 7/303
See application file for complete search history.

(56) References Cited

U.S. PATENT DOCUMENTS

| 5,386,478 | A | 1/1995 | Plunkett |
| 6,154,549 | A * | 11/2000 | Arnold et al. ................. 381/104 |
| 7,379,552 | B2 | 5/2008 | Neervoort et al. |
| 7,630,501 | B2 | 12/2009 | Blank et al. |
| 2003/0023331 | A1 | 1/2003 | Komura et al. |
| 2003/0119523 | A1 | 6/2003 | Bulthuis |
| 2006/0088174 | A1* | 4/2006 | DeLeeuw et al. ............... 381/96 |

(Continued)

FOREIGN PATENT DOCUMENTS

| CN | 1627862 A | 6/2005 |
| CN | 1747533 A | 3/2006 |
| CN | 1774871 A | 5/2006 |
| CN | 1835648 A | 9/2006 |
| CN | 101438604 A | 5/2009 |
| WO | WO-0184884 A2 | 11/2001 |

OTHER PUBLICATIONS

International Search Report and Written Opinion—PCT/US2012/067874—ISA/EPO—May 17, 2013.
Partial International Search Report—PCT/US2012/067874—ISA/EPO—Apr. 3, 2013.

*Primary Examiner* — Duc Nguyen
*Assistant Examiner* — Kile Blair
(74) *Attorney, Agent, or Firm* — Austin Rapp & Hardman

(57) ABSTRACT

A wireless device is provided that makes use of other nearby audio transducer devices to generate a surround sound effect for a targeted user. To do this, the wireless device first ascertains whether there are any nearby external microphones and/or loudspeaker devices. An internal microphone for the wireless device and any other nearby external microphones may be used to ascertain a location of the desired/targeted user as well as the nearby loudspeaker devices. This information is then used to generate a surround sound effect for the desired/targeted user by having the wireless device steer audio signals to its internal loudspeakers and/or the nearby external loudspeaker devices.

28 Claims, 20 Drawing Sheets

(56) References Cited

U.S. PATENT DOCUMENTS

| | | |
|---|---|---|
| 2007/0025555 A1* | 2/2007 | Gonai et al. .................. 381/17 |
| 2008/0077261 A1 | 3/2008 | Baudino et al. |
| 2008/0226087 A1* | 9/2008 | Kinghorn ...................... 381/59 |
| 2009/0110204 A1 | 4/2009 | Walsh et al. |
| 2009/0262946 A1 | 10/2009 | Dunko |
| 2009/0304205 A1 | 12/2009 | Hardacker et al. |
| 2010/0329489 A1 | 12/2010 | Karaoguz |
| 2011/0091055 A1 | 4/2011 | Leblanc |

* cited by examiner

AUTOMATED USER/SENSOR LOCATION RECOGNITION TO CUSTOMIZE AUDIO PERFORMANCE IN A DISTRIBUTED MULTI-SENSOR ENVIRONMENT

CLAIM OF PRIORITY UNDER 35 U.S.C. §119

The present Application for Patent claims priority to U.S. Provisional Application No. 61/577,483 entitled "Automated User Location Recognition To Enhanced Audio Performance In A Multi-Speaker Environment" filed Dec. 19, 2011, and assigned to the assignee hereof and hereby expressly incorporated by reference herein.

BACKGROUND

1. Field

One feature generally relates to wireless devices, multi-microphone, and multi-speaker audio systems. In one example, a wireless device is adapted to automatically perform microphone, loudspeaker, and/or user detection and location to provide a customized three-dimensional immersive sound experience for the user.

2. Background

Wireless devices (e.g., mobile devices, mobile phones, mobile communication devices, smart phones, personal/mobile computing devices, etc.) often include one or more microphones to capture audio signals from a desired/targeted user. Additionally, such wireless devices often also include one or more loudspeakers through which audio signals are emitted to the targeted user. However, the typical small size of some wireless devices (e.g., mobile devices) makes it difficult to improve a user's experience by producing a surround sound effect. A surround sound effect may be produced by shaping audio signals so that they are emitted from two or more different external and/or internal loudspeaker devices to create a surround sound sensation for the targeted user.

One challenge in producing such shaped audio signals using external loudspeakers is in identifying the location, position, and/or distance of the external loudspeakers relative to the desired/targeted user. That is, unlike integrated loudspeakers, the position, location, and/or distance between the targeted user (and/or wireless device) and the external speakers is unknown by the wireless device.

Therefore, a way is needed that permits a wireless device to leverage nearby microphones and/or loudspeaker devices to improve a targeted user's sound experience.

SUMMARY

According to a first aspect, a method operational in a wireless device is provided for automatically detecting a target user/listener location and customizing audio performance. A relative location of a target user is ascertained with respect to the wireless device and one or more external loudspeakers, where the location of the target user relative to the wireless device is arbitrary. Speaker-specific audio signals are wirelessly sent from the wireless device to the one or more external loudspeakers, each speaker-specific audio signal adapted to be played back at a corresponding external loudspeaker to achieve a surround sound experience aimed at the target user. A location for one or more external devices is ascertained relative to the wireless device, the external devices including the one or more external microphones and/or the one or more loudspeakers. One or more external microphones are then selected from the one or more external devices. Audio signals are captured from the target user on the one or more selected external microphones and/or one or more internal microphones to ascertain the relative location of the target user with respect to the wireless device. The captured audio from each of the one or more external microphones may be compared to each other to ascertain a distance and relative orientation to ascertain the target user location. The one or more selected external microphones may be instructed to capture the audio signals from the target user to ascertain a direction of arrival for the captured audio signal. Ascertaining the location for the one or more external devices relative to the wireless device may include instructing the one or more external microphones to capture audio signals from the one or more external loudspeakers to ascertain one or more corresponding directions of arrival for the captured audio signals. Ascertaining the relative location of the target user with respect to the wireless device may include (a) ascertaining a location of an external device relative to an external device, and/or (b) ascertaining the location of the target user relative to the external device. The speaker-specific audio signals from the wireless device to the one or more external loudspeakers may be sent in inaudible form via a wireless communication interface. According to one aspect, the wireless device may be a mobile telephone device.

According to a second aspect, a method operational in a wireless device is provided for automatically customizing audio performance. The wireless device may automatically ascertain the presence of one or more external loudspeakers and/or automatically ascertain a relative location of a target user with respect to the one or more external loudspeakers. Then, the wireless device may steer first audio signals to the one or more external loudspeakers to achieve a surround sound experience aimed at the target user. The wireless device may also (a) automatically ascertain the presence of one or more external microphones; (b) instruct the one or more external microphones to capture second audio signals from the one or more external loudspeakers to ascertain one or more corresponding directions of arrival for the captured second audio signals; and/or (c) instructing the one or more external microphones to capture a third audio signal from the target user to ascertain a direction of arrival for the captured third audio signal, wherein the relative location of the target user with respect to the one or more external loudspeakers is ascertained based on the directions of arrival. The wireless device may steer the first audio signals to one or more internal loudspeakers to achieve the surround sound experience aimed at the target user. The first audio signals may be sent from the wireless device to the one or more external loudspeakers in inaudible form via a wireless communication interface.

According to a third aspect, a method operational in an external device is provided. The external device may (a) receive a first instruction from a wireless device to activate a microphone and provide a first audio signal captured by the microphone to the wireless device in order to locate the external device relative to the wireless device, (b) receive a second instruction from the wireless device to play back a second audio signal through an external loudspeaker to assist in locating the external device relative to the wireless device, and/or (c) receive a third instruction from the wireless device to activate the microphone and send a third audio signal captured by the microphone to the wireless device in order to ascertain a location of a target user relative to the wireless device. The external device may be further adapted to (a) receive speaker-specific audio signals from the wireless device assigned to one or more corresponding external loudspeakers; and/or (b) send the speaker-specific audio signals to the one or more corresponding external loudspeakers, each speaker-specific audio signal adapted to achieve a surround sound experience aimed at the target user. The speaker-specific audio signals from the wireless device to the one or more external loudspeakers may be received in inaudible form via a wireless communication interface.

DRAWINGS

DETAILED DESCRIPTION

In the following description, reference is made to the accompanying drawings in which is shown, by way of illustration, specific embodiments in which the disclosure may be practiced. The embodiments are intended to describe aspects of the disclosure in sufficient detail to enable those skilled in the art to practice the invention. Other embodiments may be utilized and changes may be made to the disclosed embodiments without departing from the scope of the disclosure. The following detailed description is not to be taken in a limiting sense, and the scope of the present invention is defined only by the appended claims.

The term "wireless device" may be used herein to refer to "mobile devices", "mobile phone", "mobile communication devices", "mobile computing devices", "digital tablets", "smart phones", among other devices. The terms "loudspeaker" and/or "speaker" refers to may be used herein interchangeably to refer to audio transducers that convert an electrical signal into an audio sound. The term "microphone" may be used herein to refer to audio transducers that convert audio into an electrical signal.

Overview

The present disclosure refers to apparatuses, methods, and computer-readable mediums including instructions for detecting the location, position, and/or distance of external loudspeakers relative to a wireless device to allow providing a customized three dimensional immersive sound experience to a targeted user. Generally, a device may be adapted to automatically estimate locations of loudspeakers, microphones, and a target user in a coordinate system (e.g., of the device) to be used for a customized spatial sound reproduction for the target user using all available acoustic devices in an optimal and seamless way.

One feature provides for a wireless device that makes use of other nearby audio transducer devices to generate a surround sound effect for a targeted user. To do this, the wireless device first ascertains whether there are any nearby external microphones and/or loudspeaker devices. An internal microphone for the wireless device and any other nearby external microphones may be used to ascertain a location of the desired/targeted user as well as the nearby loudspeaker devices. This information is then used to generate a surround sound effect for the desired/targeted user by having the wireless device steer audio signals to its internal loudspeakers and/or the nearby external loudspeaker devices.

Exemplary Operating Environment

Figure 1:
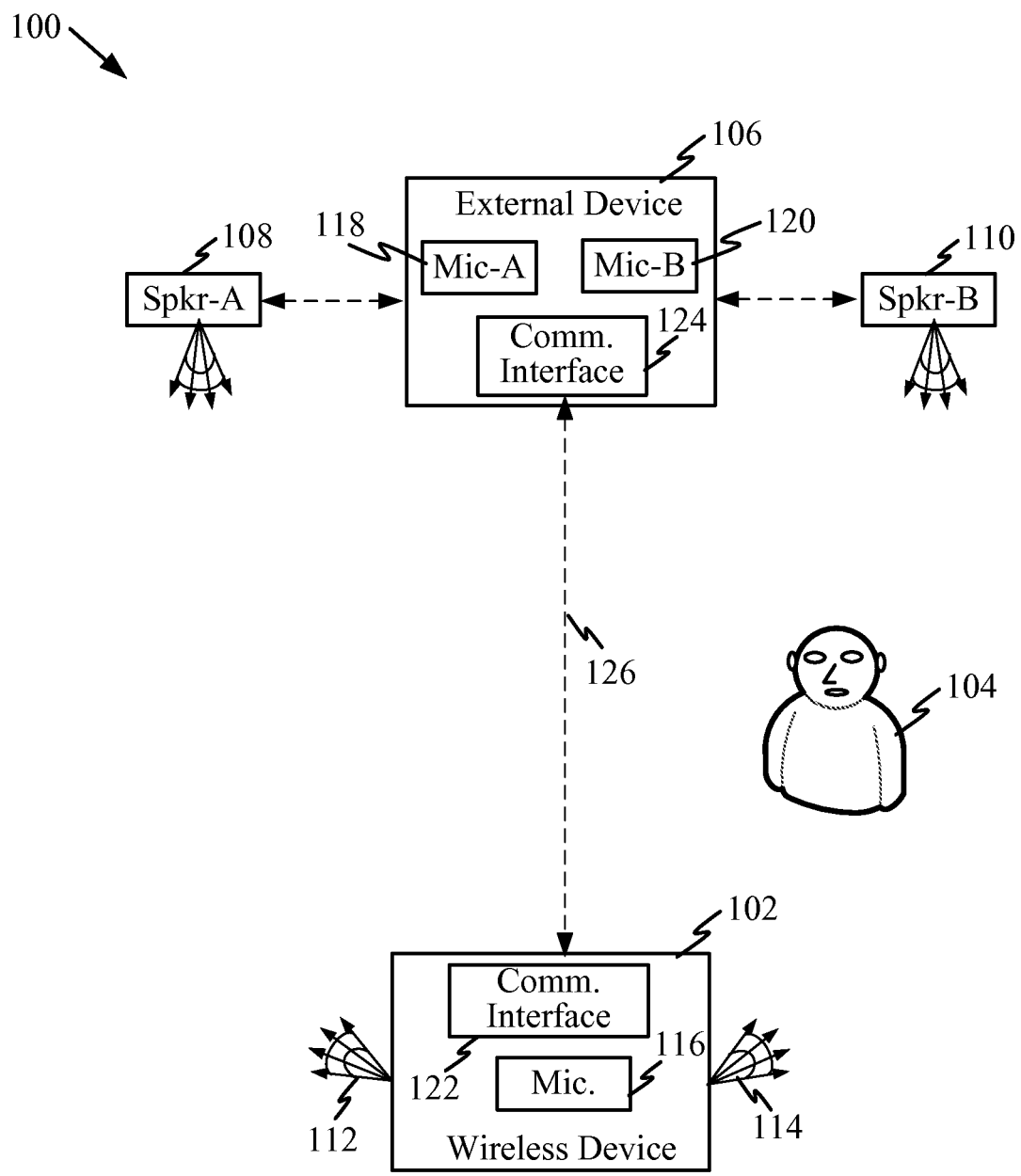
FIG. 1 illustrates an exemplary environment where a wireless device may make use of one or more nearby external devices to improve audio delivery to a desired user (or intended listener/speaker).

FIG. 1 illustrates an exemplary environment 100 where a wireless device 102 may make use of one or more nearby external devices 106 to improve audio delivery to a desired user (or intended listener/speaker). In this example, the exemplary environment 100 may include the wireless device 102 and one or more external device(s) 106. The wireless device 102 may include one or more loudspeakers 112 and 114, a communication interface 122 and one or more microphones 116. The external device 106 may include one or more microphones 118 and 120, and one or more loudspeakers 108 and 110 (e.g., speakers, audio transducers, etc.) that are separate from, coupled to, and/or integral with the external device 106. The wireless device 102 and external device 106 may each include a wireless communication interface 122 and 124, respectively. The wireless communication interfaces 122 and 124 may allow the wireless device 102 to send commands and/or instructions to the external device 106 and to receive signals and/or data from the external device 106 over a wireless link 126 (e.g., infrared link, Bluetooth link, peer-to-peer link, etc.). For instance, the wireless device 102 may direct the external device 106 to activate its microphone(s) 118 and 120 to capture audio at a particular time and/or for a particular time interval. The wireless communication interface 122 may also allow the wireless device 102 to selectively request one or more internal loudspeakers 112 and 114 and/or one or more of the external loudspeakers 108 and 110 to emit audio signals. According to various examples, the wireless communication interface 122 may serve to communicatively couple the wireless device 102 to one or more external devices 106 via the wireless link 126, which may be at least one of either a wireless communication network (e.g., WiFi, cellular network, etc.) and/or a peer-to-peer link (Bluetooth, near field communications, etc.). The wireless communication interface 122 may also permit the wireless device 102 to transmit and/or receive audio signals in inaudible form (e.g., digitized, packetized, as payload, etc.). In various examples, the wireless device 102 may communicate with the one or more external loudspeakers 108 and 110 either directly, via a direct point-to-point communication link, or indirectly, via the external device 106.

In one exemplary implementation, the wireless device 102 may be adapted to make use of the external device 106 and/or one or more of the external microphones 118 and 120 (along with the integrated microphone(s) 116) to enhance audio/sound capture from the target user 104. Within the exemplary operating environment 100, the capture of audio/sound from the target user 104 may be enhanced by use of selected microphones based on a detected direction of arrival of sound for the target user.

According to one aspect, a plurality of microphones may be used to estimate, ascertain, and/or obtain a position or location of the user 104 relative to the wireless device 102 and/or the external device 106. It is assumed that all audio signals captured by the integrated microphone(s) 116 and external microphones 118 and 120 can be routed (e.g., in an inaudible form such as digital packets, analog encoded signal, etc.) to the wireless device 102 through either a wired link or wireless communication link. For example, upon capturing an audio signal at the external microphones 118 and 120, the audio signal may be converted into an electrical form (e.g., analog, digital, etc.) that is transmitted (e.g., in an inaudible form) to the wireless device via the wireless communication link 126. By using external microphones, the wireless device 102 may be able to detect and/or locate external loudspeakers 108 and 110 and/or the target user 104 relative to the wireless device 102. User location detection may involve spatial sound discrimination within the operating environment 100 (e.g., a car or home environment) using nearby audio devices (e.g., external microphones 118 and/or 120 and/or loudspeakers 108 and/or 110) and integrated audio devices of the wireless device 102 (e.g., one or more microphones 116 and/or loudspeakers 112 and 114).

In one exemplary implementation, the wireless device 102 may be adapted to make use of the external device 106 and/or one or more of the external loudspeakers 108 and 110 (along with the integrated loudspeakers 112 and 114) to emit audio to the target user 104. Within such exemplary operating environment 100, the user 104 may be the intended target of audio/sound emitted from the loudspeakers 108, 110, 112, and/or 114. To enhance audio/sound delivery to the user 104, it may be desirable to direct the audio/sound to the user 104 and/or provide a surround sound experience.

According to another aspect, automatic sound field customization may be performed by the wireless device 102 by taking advantage of the nearby external loudspeakers 108 and 110. That is, having located the target user 104 with respect to the wireless device 102 and/or the external loudspeakers 108 and 110, the wireless device 102 may perform (either directly or indirectly) audio signal steering to the various loudspeakers 108, 110, 112, and/or 114 that may be used to achieve surround sound audio to the target user 104. This process may also involve automatic inter-loudspeaker level/delay equalization and room/environment equalization (especially for better reproduction in low-frequency range).

Combining Distributed Microphones to Enhance Captured Sound Quality

According to a first aspect, a wireless device may attempt to automatically or autonomously identify surrounding microphones in nearby external devices and makes use of such microphones to enhance audio/sound capture quality. This process may involve determining whether such microphones are available in nearby external devices and then ascertaining whether their location relative to a wireless device microphone is useful or not.

FIGS. 2-5 illustrate various scenarios of audio/sound capture where a plurality of microphones may be used to create a focus audio pick-up region for a desired target user. The wireless device 102 may include one or more microphones 116 but can also take advantage of other external microphones 118 and 120 of the external device to increase spatial diversity thereby allowing triangulation of the desired target user/speaker. In these scenarios, the directions of arrival (DOA) are relative to microphones at the external device 106. A first audio/sound signal 202 from the target user 104 is captured by one or more microphones at the external device 106. Similarly, a second audio/sound signal 204 emitted from the wireless device 102 is captured by one or more microphones at the external device 106. The angle between the first and second audio/sound signals 202 and 204 is denoted by $\alpha$. The scenarios where the angle $\alpha$ is less than 45 degrees entail less ambiguity in ascertaining target user 104 location since capturing microphones in the nearby external device 106 and wireless device 102 are sufficiently apart to obtain meaningful information about the target user 104 location. That is, the further apart the microphones are, the easier it is to ascertain the target user 104 location. Since the microphone-to-mouth axes (e.g., between a microphone and desired user 104) for the wireless device 102 and the external device 106 are not same, they can be used to triangulate into the mouth area (of the target user 104) without picking up audio/sound from back, side, and/or front directions. Such focused sound pick up region from the wireless device 102 microphone is illustrated by a first beam 208 while the focused sound pick up region from the external device 106 microphone is illustrated by second beam 206.

Meanwhile, the scenarios where the angle $\alpha$ is more than 45 degrees entail greater ambiguity in ascertaining desired user 104 location because as the directions of arrival (DOA) become more aligned, the less incentive there is to combine their information for desired user location. That is, the more aligned the DOAs become, the less benefit the multiple microphones provide in performing desired user location. In this scenario, the microphone closest to the desired user 104 may be used.

Figure 2:
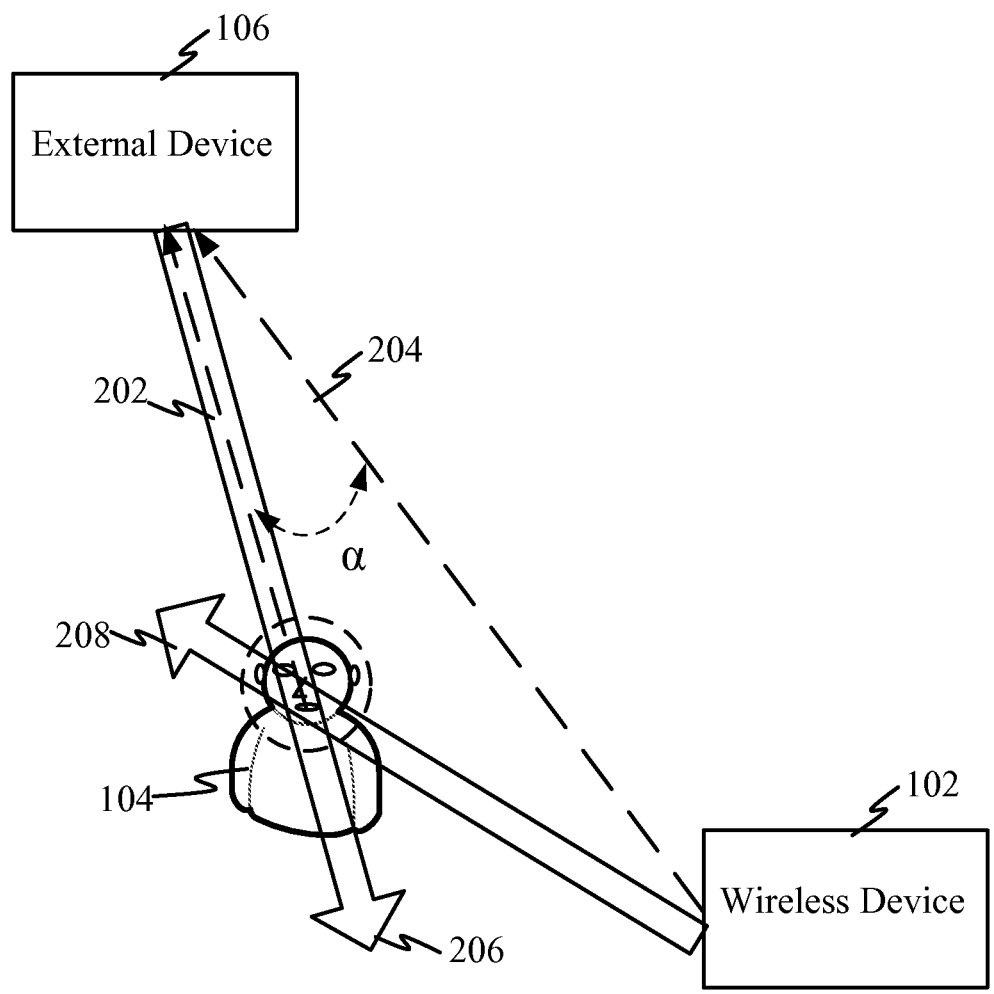
FIGS. 2-6 illustrate various scenarios of audio/sound capture where a plurality of microphones may be used to create a focus audio pick-up region for a desired target user.

FIG. 2 illustrates a first scenario where the directions of arrival of sound signals are ascertained at an external device 106. For instance, a first sound/audio signal 202 from the target user 104 is received at a microphone of the external device 106. A second sound/audio signal 204 may be received at the microphone of the external device 106. The directions of arrival of the first and second sound/audio signals 202 and 204 form an angle $\alpha$, where $\alpha<45$ degrees in this example. In this scenario, since $\alpha<45$ degrees, the target user 104 can be located by the wireless device 102 with less ambiguity.

Figure 3:
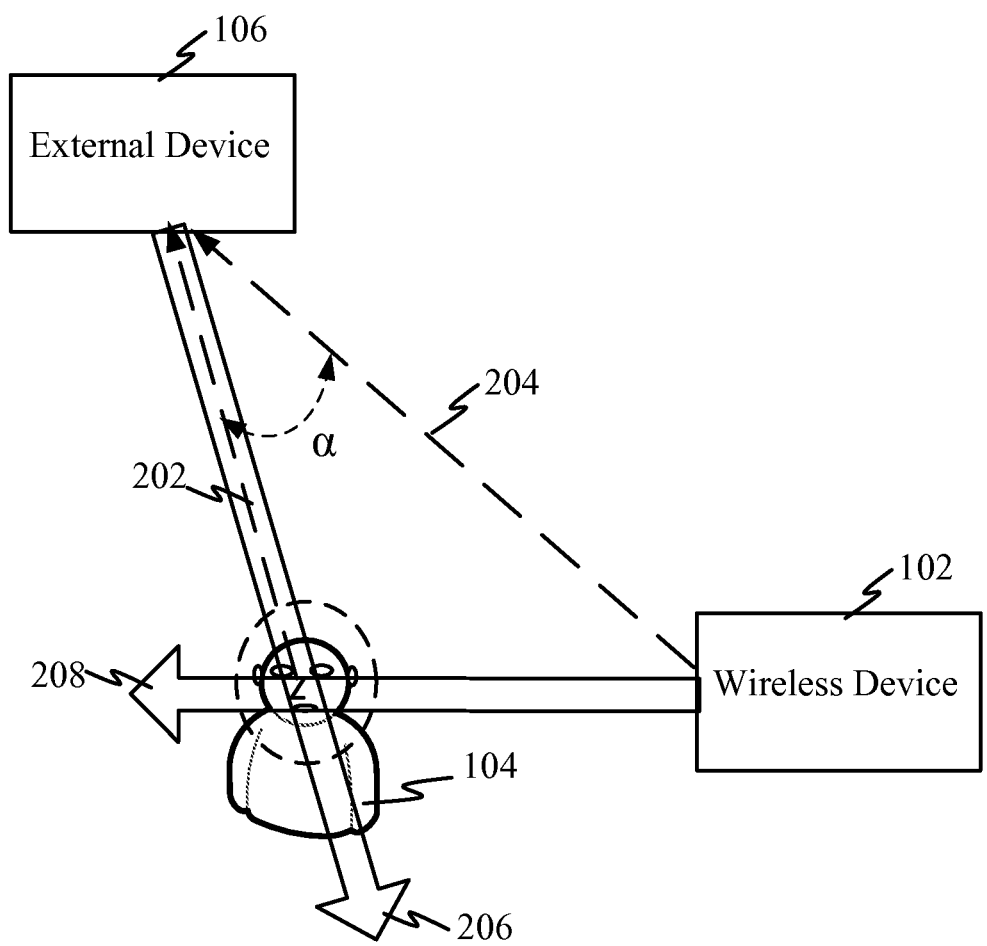

FIG. 3 illustrates a second scenario where the directions of arrival of first and second sound/audio signals 202 and 204 form an angle $\alpha$ at the external device 106, where $\alpha\approx45$ degrees. In this scenario, since the angle $\alpha\approx45$ degrees, there may be some ambiguity in ascertaining a location for the target user 104. That is, as the wireless device 102 and external device 106 get closer to each other, it becomes more difficult to obtain signal measurements that are sufficiently distinct to perform triangulation and obtain a target user location.

Figure 4:
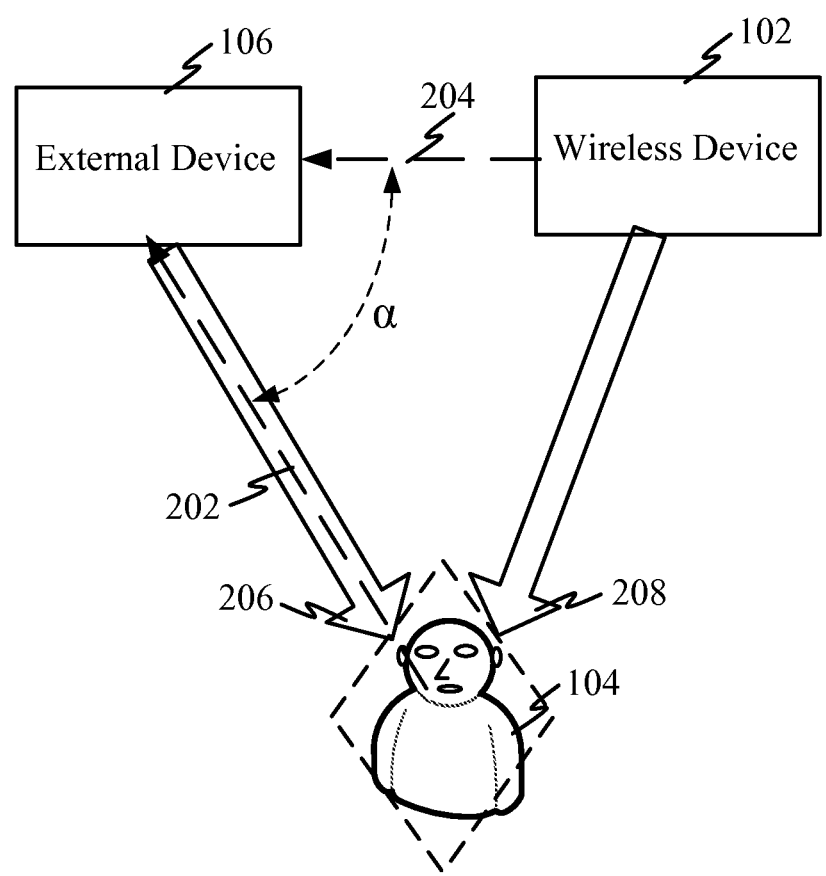

FIG. 4 illustrates a third scenario where the directions of arrival of first and second sound/audio signals 202 and 204 form an angle α at the external device 106, where α>45 degrees. In this scenario, since α>45 degrees, there may be significant ambiguity in ascertaining a location for the desired user 104 or it may not be possible to ascertain such location. Since the wireless device 102 and external device 106 have gotten closer to each other, it is more difficult to obtain signal measurements that are sufficiently distinct to perform triangulation and obtain a target user location.

Figure 5:
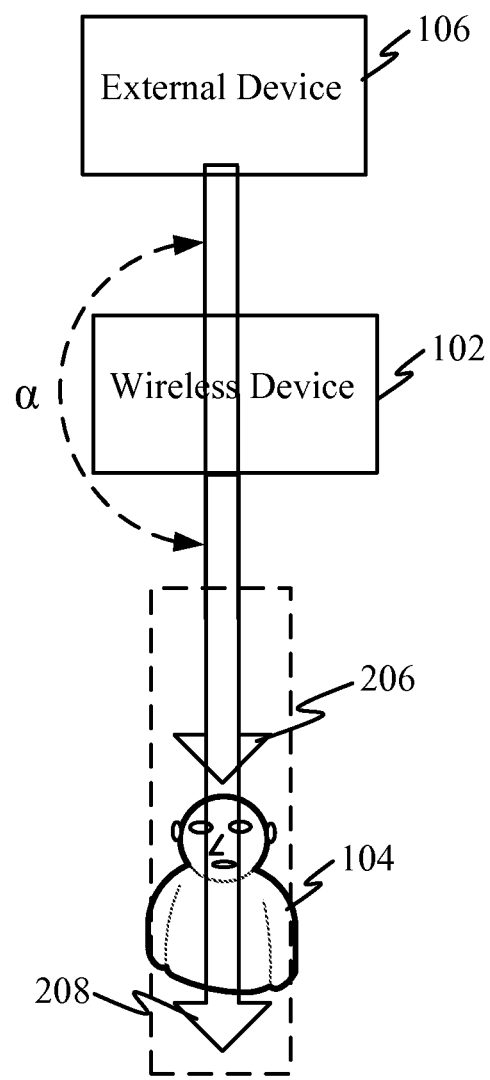

FIG. 5 illustrates a fourth scenario where the directions of arrival of first and second sound/audio signals form an angle α, where α≈180 degrees. In this scenario the wireless device 102 is between the external device 106 and the desired user 104 (e.g., α≈180 degrees), the diversity of microphones cannot be used to ascertain a location for the desired user 104. Hence, there is less incentive to combine the directions of arrival or for the wireless device 102 to use the microphones at the external device 106. Since the wireless device 102 is the closest to the target user 104, its microphone(s) may be used to capture audio/sound from the target user 104 while possibly ignoring or disabling any audio/sound captured by the external device 106 microphone(s).

Figure 6:
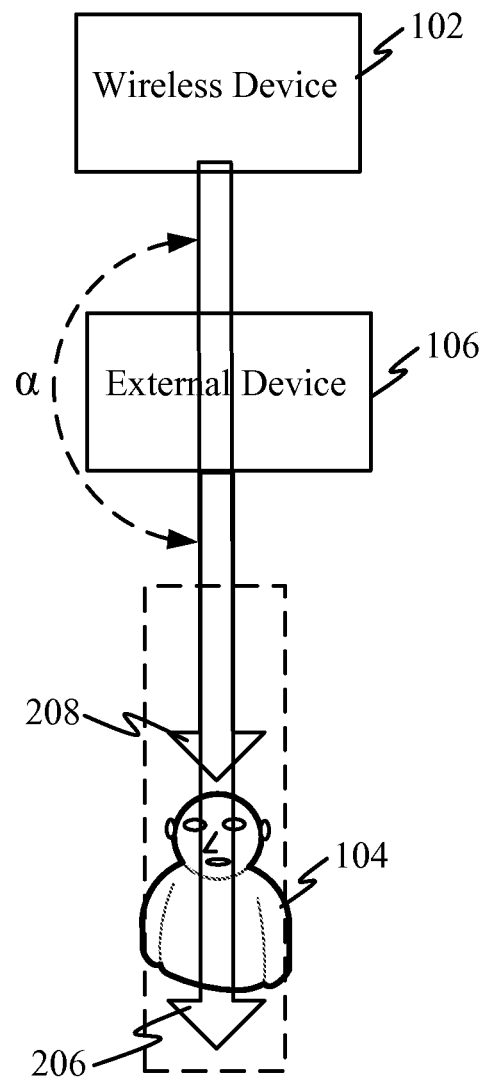

FIG. 6 illustrates a fifth scenario where the directions of arrival of first and second sound/audio signals form an angle α, where α≈180 degrees. In this scenario the external device 104 is between the wireless device 102 and the desired user 104 (e.g., α≈180 degrees), the diversity of microphones cannot be used to ascertain a location for the desired user 104. Hence, there is less incentive to combine the directions of arrival or for the wireless device 102 to use the microphones at the external device 106. Since the external device 106 is the closest to the target user 104, its microphone(s) may be used to capture audio/sound from the target user 104 while possibly ignoring or disabling any audio/sound captured by the external device 106 microphone(s).

Combining integrated and/or external microphones may thus be used to enhance audio/sound capture quality. The use of multiple microphones may also serve to track (e.g., ascertain a relative position/location) a location for the target user. Such user location/tracking using multiple microphones may permit beamforming, nullforming, and/or masking with increased degree of freedom (DOF) so as to focus the capture of audio/sound from a focused area (i.e., desired user).

However, before combining multiple microphones, the wireless device 102 may first ascertain whether such combination actually increases the DOF. Additionally, where a plurality of microphones is present, these microphones may be synchronized. For instance, an automatic speech/speaker recognition (ASR) engine may be implemented by the wireless device 102 for this purpose. Timestamp information provided by the ASR engine may be used to synchronize all microphone signals for the target speech.

Additionally, the ASR may also be used for initiating the synchronization process by just accepting a certain activation verbal code (e.g., a sentence or word which would not be commonly uttered except this specific purpose). The ASR may also serve to implement a target user dependent system, which only enables certain functionalities when target user initiates the process.

In one example, the ASR may be implemented on the wireless device 102 which may use its integrated microphone(s) to capture a reference audio/sound. The ASR may then correlate this reference audio/sound to segments or portions of audio/sound streams received from the external microphones (e.g., microphones for external devices) to achieve synchronization.

Figure 7:
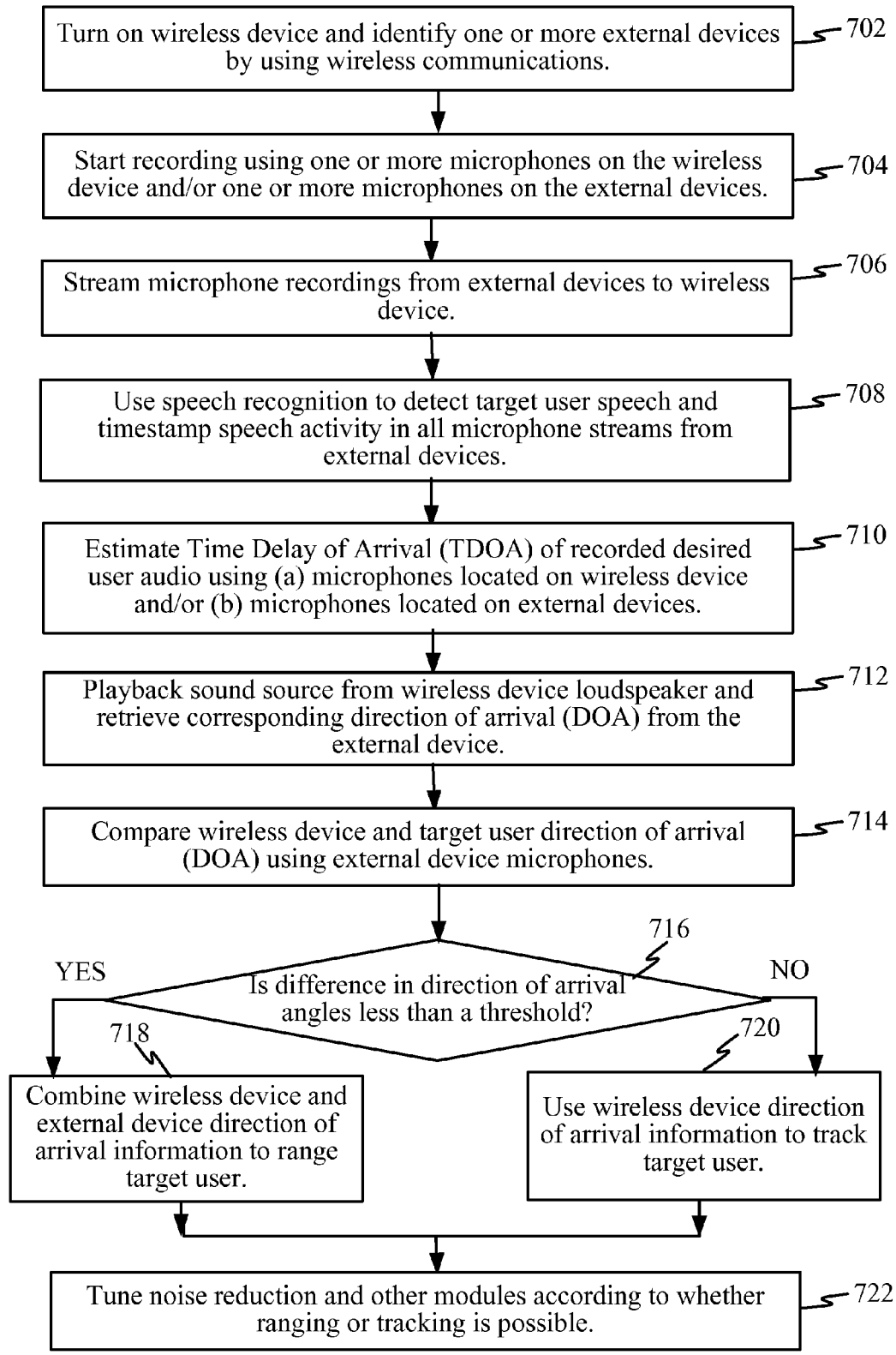
FIG. 7 is a flow diagram illustrating how a wireless device may detect and may use of one or more external microphones to enhance audio/sound capture from a desired user/speaker.

FIG. 7 is a flow diagram illustrating how a wireless device may detect and may use of one or more external microphones to enhance audio/sound capture from a desired user/speaker. The wireless device may be turned on (i.e., powered on) causing it to identify one or more external devices by using wireless communications 702. For instance, a wireless communication scheme may be implemented where devices may broadcast their identifier, channel, configuration information, etc., allowing other devices to find them. Once the wireless device locates one or more external devices, it may optionally query the one or more external devices to ascertain their capabilities (e.g., whether it has one or more microphones, speakers, etc.). The wireless device may then start recording using one or more microphones on the wireless device and/or one or more microphones on the identified external devices 704. Audio/sound recordings (captured) by the one or more microphones on the external device(s) may be streamed to the wireless device 706. In one example, the wireless device may use speech recognition to detect target user speech and/or timestamp speech activity in all microphone streams from external devices 708.

The wireless device may estimate a time delay of arrival (TDOA) of recorded desired user audio using (a) the one or more microphones located on the wireless device and/or (b) the one or more microphones located on the external devices 710. Sound/audio is then played back from wireless device loudspeaker (to be captured by the external device(s)) and the wireless device retrieves a corresponding direction of arrival (DOA) from the external device(s) 712. The wireless device DOA and target user DOA are then compared by the wireless device using the external device microphone(s) 714.

The wireless device then ascertains whether the difference in direction of arrival (DOA) angles is less than a threshold (e.g., maximum angle α) 716. If so, the wireless device and external device direction of arrival information is combined to range target user 718. Otherwise, the wireless device direction of arrival information is used to track the desired user 720. The wireless device may then tune or adjust noise reduction (NR) and other modules according to whether ranging and/or tracking is possible 722.

Combine Distributed Loudspeakers to Enhance Reproduced Sound Quality

Prior to combining audio output from multiple loudspeakers to enhance reproduced sound quality (e.g., provide a surround sound effect to a target user), the wireless device may ascertain one or more locations of the loudspeakers with respect to a target user/listener. Then, inter-loudspeaker gain and/or delay for the loudspeaker(s) may be adjusted to achieve the enhanced reproduced sound quality for the target user/listener and/or a crosstalk canceller may be implemented for binaural 3D audio reproduction.

While combining microphones does not necessitate specifying the location of all available acoustic resources, in combining loudspeakers the wireless device may estimate the angle between the wireless device and the external loudspeakers and the desired user/listener by estimating the directions of arrival DOAs of audio/sound from the external loudspeakers and the desired user/listener. However, one problem is that wireless devices using only their integrated microphones can determine only the angles for these external loudspeakers and the desired user/listener, not the distance between them. Thus, the wireless device may make use of another device (i.e., one or more external devices) that has a microphone and is far enough to triangulate the sound sources (i.e., loudspeakers and/or the desired user/listener).

A method used for ascertaining relative location/position of loudspeakers may assume that no geometrical information regarding distributed microphones is previously known. In one example, where the wireless device may be a mobile phone, it may be assumed that the target user/listener and the wireless device are at the same location. Several methods for generating a map of microphones (e.g., acoustic transducers) and sound sources (e.g., loudspeakers, desired or target user/speaker/listener) are disclosed.

Figure 8:
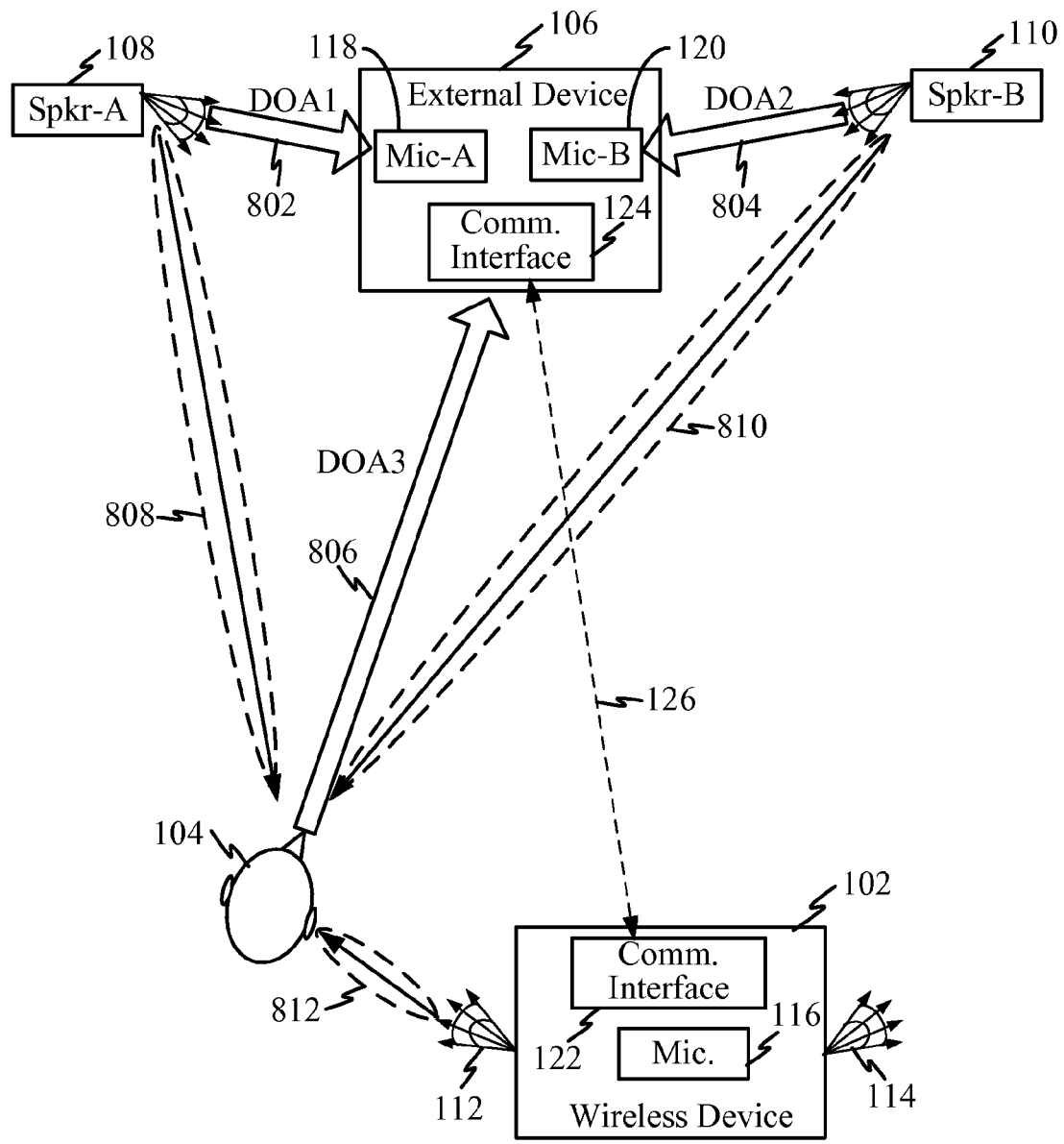
FIG. 8 illustrates an example of how directions of arrival from external loudspeakers and a target user/listener are ascertained in order to find relative location for the loudspeakers and a target user and steer loudspeaker beams to the target user.

FIG. 8 illustrates an example of how directions of arrival from external loudspeakers and a target user/listener are ascertained in order to find relative location for the loudspeakers and a target user and steer loudspeaker beams to the target user. Generally, a determination is made on whether external loudspeakers 118 and 120 are aligned with the external loudspeakers 108 and 110. For instance, a first direction of arrival (DOA1) 802 from a first loudspeaker 108 to the external device 106 may be ascertained. Similarly, a second direction of arrival (DOA2) 804 from a second loudspeaker 110 to the external device 106 may also be ascertained. If the first and second directions of arrival are approximately 180 degrees to each other, then a third direction of arrival (DOA3) 806 for the target user/listener 104 to the external device 106 may be used to steer loudspeaker beams 808 and 810 to the desired/target user/listener 104. However, one challenge is how to map the external devices (e.g., external microphones 118 and 120 and/or loudspeakers 108 and 110) relative to the wireless device 102.

Figure 9:
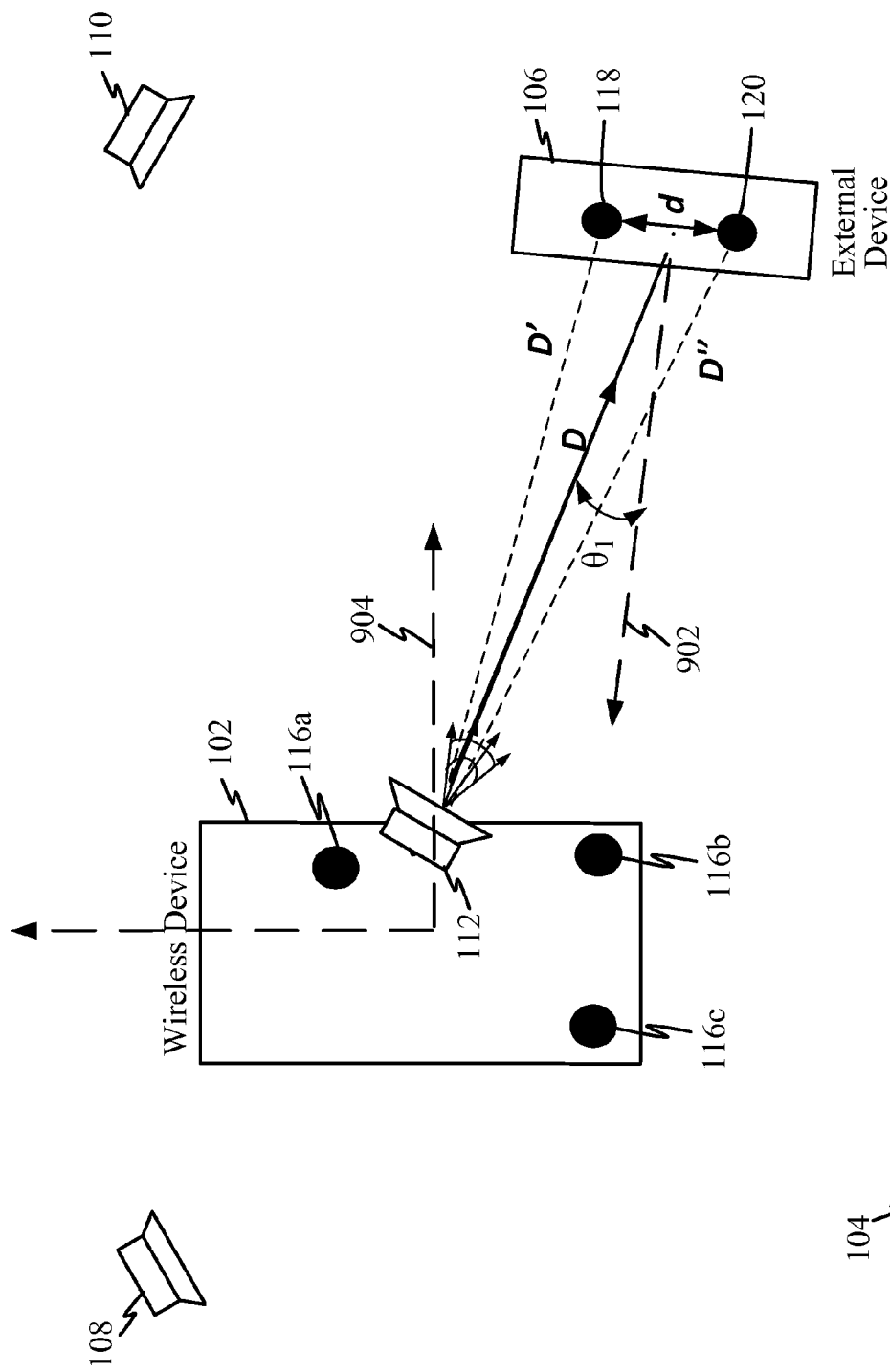
FIG. 9 illustrates how a map for distributed audio transducers and target user location may be ascertained.

FIG. 9 illustrates how a map for distributed audio transducers and target user location may be ascertained. The wireless device 102 seeks to find the location of microphones 118 and 120, loudspeakers 108 and 110, and target user 104 relative to a coordinate system given of a wireless device 102. The wireless device loudspeaker 112 may emit an audio/sound signal that is captured by the microphones 118 and 120 of the external device 106. Here, the distance to the first microphone 118 may be denoted as D' and the distance to the second microphone 120 may be denoted as D". The wireless device 102 and external device 106 may be time-synchronized so that a time of propagation from a speaker 112 to a microphone 118 or 120 may be ascertained for a sound signal. Knowing the time of propagation and velocity of sound, the distances $D_1'$ and $D_1"$ from the speaker 112 to each microphone 118 and 120 may be ascertained. The distance d between the microphones 118 and 120 at the external device 106 may be known to, or is knowable by, the external device 106. For instance, since the microphones 118 and 120 may be fixed to the external device 106, the external device 106 may know the distance d and can provide it to the wireless device 102. Alternatively, the distance d may be estimated or ascertained by noise coherence, which is dependent on the distance d and frequency. For a diffuse noise field defined as $$\frac{\phi_{12}}{\sqrt{\phi_{11} \cdot \phi_{22}}},$$

where $\phi_{i,j}$ is the cross-spectral density between the signals measured using microphones i and j, the coherence may be estimated as $$\mathrm{sinc}\left(\frac{2\pi f d}{c}\right) = \frac{\sin\left(\frac{2\pi f d}{c}\right)}{\frac{2\pi f d}{c}},$$

where f is a frequency, d is the distance between microphones, and c is the speed of sound. Therefore, using ambient noise and the noise coherence function above, the distance d can be estimated. Note that the wireless device 102 may control the operations of the microphones 118 and 120 in order to ascertain the distance d.

Knowing the distance d between the microphones 118 and 120, the distance D between the wireless device 102 and external device 106 along with the direction of arrival (denoted by angle $\theta_1$) relative to external device 106 are ascertainable from the timestamps of the captured audio/sound signals received. That is, in one example, the wireless device 102 and external device 106 may be time-synchronized via, for example, wireless communication interfaces. Each external microphone 118 and 120, at the external device 106, may capture the audio signal emitted by the loudspeaker 112, at the wireless device 102. Since each captured audio signal may be timestamped (e.g., by the external device 106 and/or by the wireless device 102) and the speed of sound propagation through air is known, the distance D can be ascertained from the timestamps of one or both captured audio signals (e.g., propagation time) and the velocity of sound propagation (i.e., D=sound velocity×propagation time). For instance, the travel time (i.e., propagation time) between the time the audio signal is emitted by the loudspeaker 112 and captured by the microphones 118 and/or 120 may be ascertained in a number of ways. In a first example, the wireless device 102 and external device 106 may have synchronized clocks. In a second example, the external device 106 may have a known, fixed reply time so that when an audio signal is captured by one of the microphones 118 and 120, the external device 106 reports its arrival to the wireless device 102 (via the communication interface 124), thereby allowing the wireless device to ascertain a time of travel (i.e., time of propagation). In either the first and/or second examples, a time of travel for the emitted audio/sound signal can be obtained by the wireless device 102. The distance D between the wireless device 102 and external device 106 may then be ascertained as: distance D≈speed of sound×time of travel. Additionally, knowing the fixed distance d between the external microphones 118 and 120, and having timestamps for the corresponding audio/sound signals captured by those microphones 118 and 120, the relative orientation of the microphones (and axis 902) and angle $\theta_1$ relative to the external device 106 may be ascertained. Note that the axis for the external device may be at various angles to the axis for the wireless device 102. For instance, a first axis 902 for the external device 106 may be at an angle to a second axis 904 for the wireless device 102.

Figure 10:
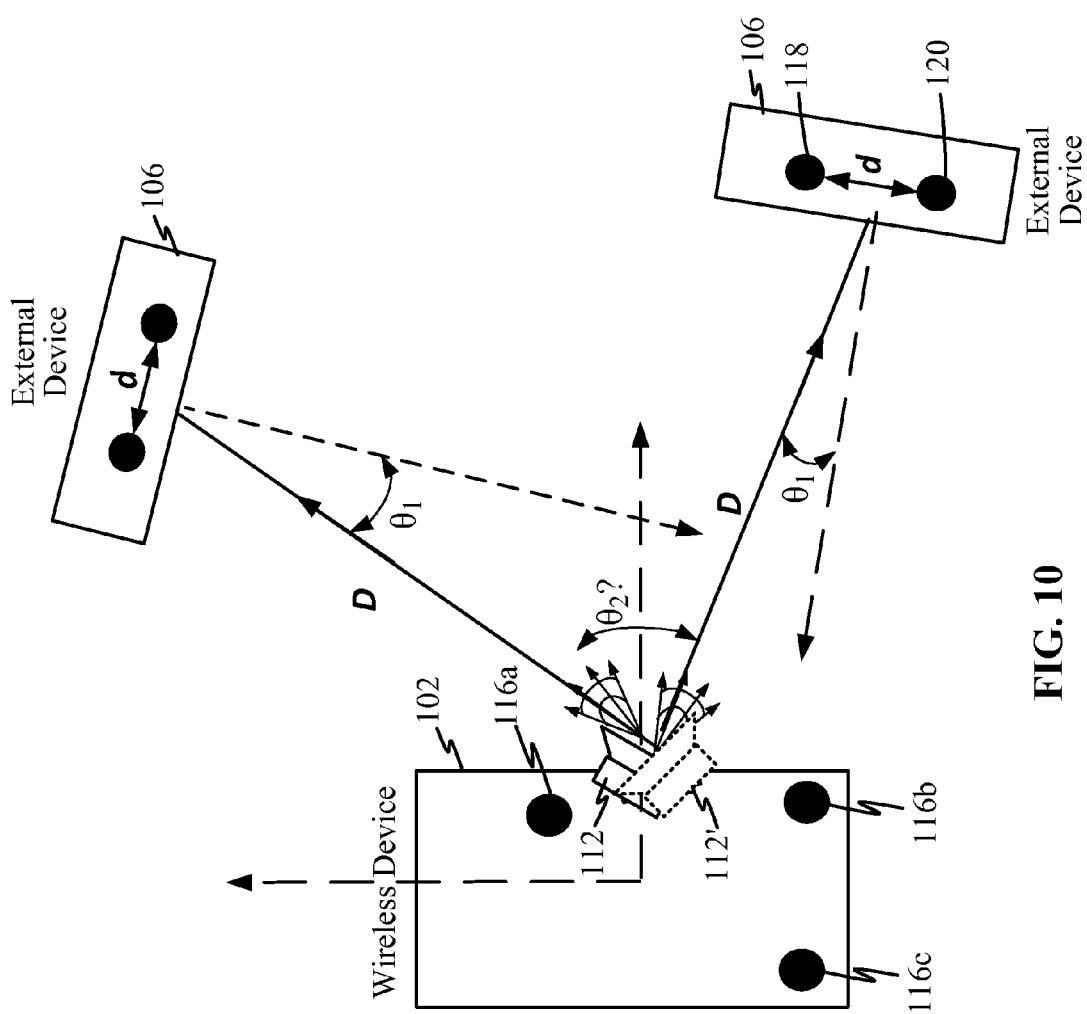
FIG. 10 illustrates this problem of identifying the relative position/location of the external device relative to the wireless device.

However, the use of the loudspeaker(s) 112 at the wireless device 102 is insufficient to ascertain a position/location of the external device 106 relative to the wireless device 102. FIG. 10 illustrates this problem of identifying the relative position/location of the external device 106 relative to the wireless device 102. That is, while the distance D and angle $\theta_1$ (relative to the external device 106) may be ascertained (as discussed above with reference to FIG. 9, e.g., by time-synchronizing the wireless device 102 and the external device 106 and using timestamps to ascertain a time of propagation), the direction of arrival (denoted by angle $\theta_2$) relative to the wireless device 102 is unknown. Thus, as illustrated here, the external device 106 may be at various locations (at a distance D) in relation to the wireless device 106.

In order to address this problem, additional loudspeakers or other directional devices may be utilized as illustrated in the various examples of FIGS. 11-14.

Figure 11:
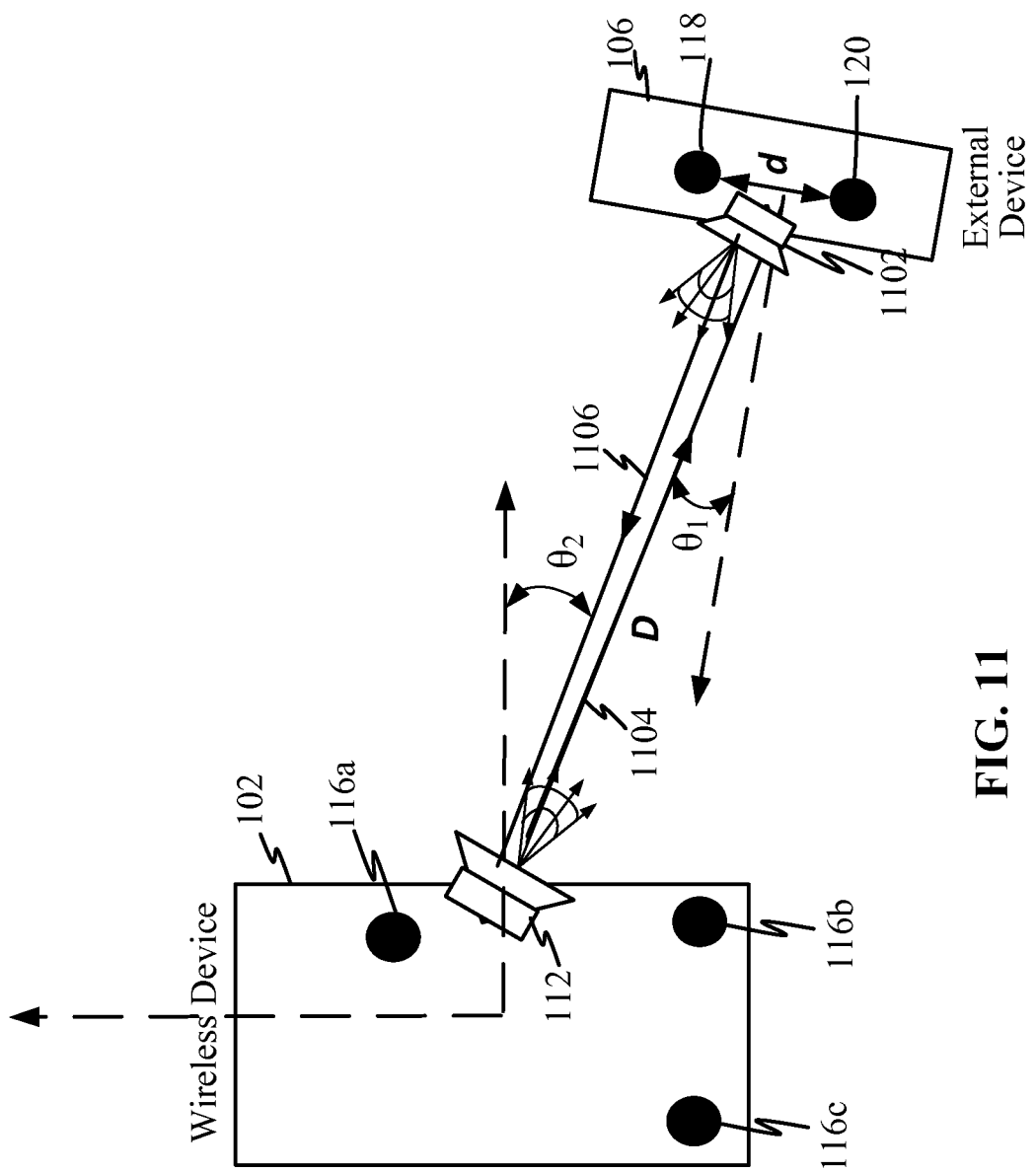
FIGS. 11-14 illustrate various solutions to ascertain a direction of arrival relative to a wireless device.

FIG. 11 illustrates a solution to ascertain a direction of arrival (denoted by angle $\theta_2$) relative to wireless device 102. In this example, a loudspeaker 1102 attached to (or integrated with) the external device 106 may be used to obtain the direction of arrival (denoted by angle $\theta_2$) relative to the wireless device 102. The wireless device loudspeaker 112 may generate or emit a sound/audio signal that is captured by the external device microphones 118 and 120 to obtain the first direction of arrival 1104 (denoted by angle $\theta_1$) relative to the external device 106. Similarly, the external device loudspeaker 1102 generates a sound/audio signal that is captured by the wireless device microphone(s) 116a, 116b, and/or 116c to obtain the second direction of arrival 1106 (denoted by angle $\theta_2$) relative to the wireless device 102. Hence, once two devices with multiple microphones and loudspeaker are detected in a same room, these can be used to locate all the locations/positions of microphones and loudspeakers and even target users. That is, in similar fashion as discussed with regard to FIG. 9, the audio/sound signal from the external device 106 to the wireless device 102 serves to obtain the distance D and angle $\theta_2$.

Figure 12:
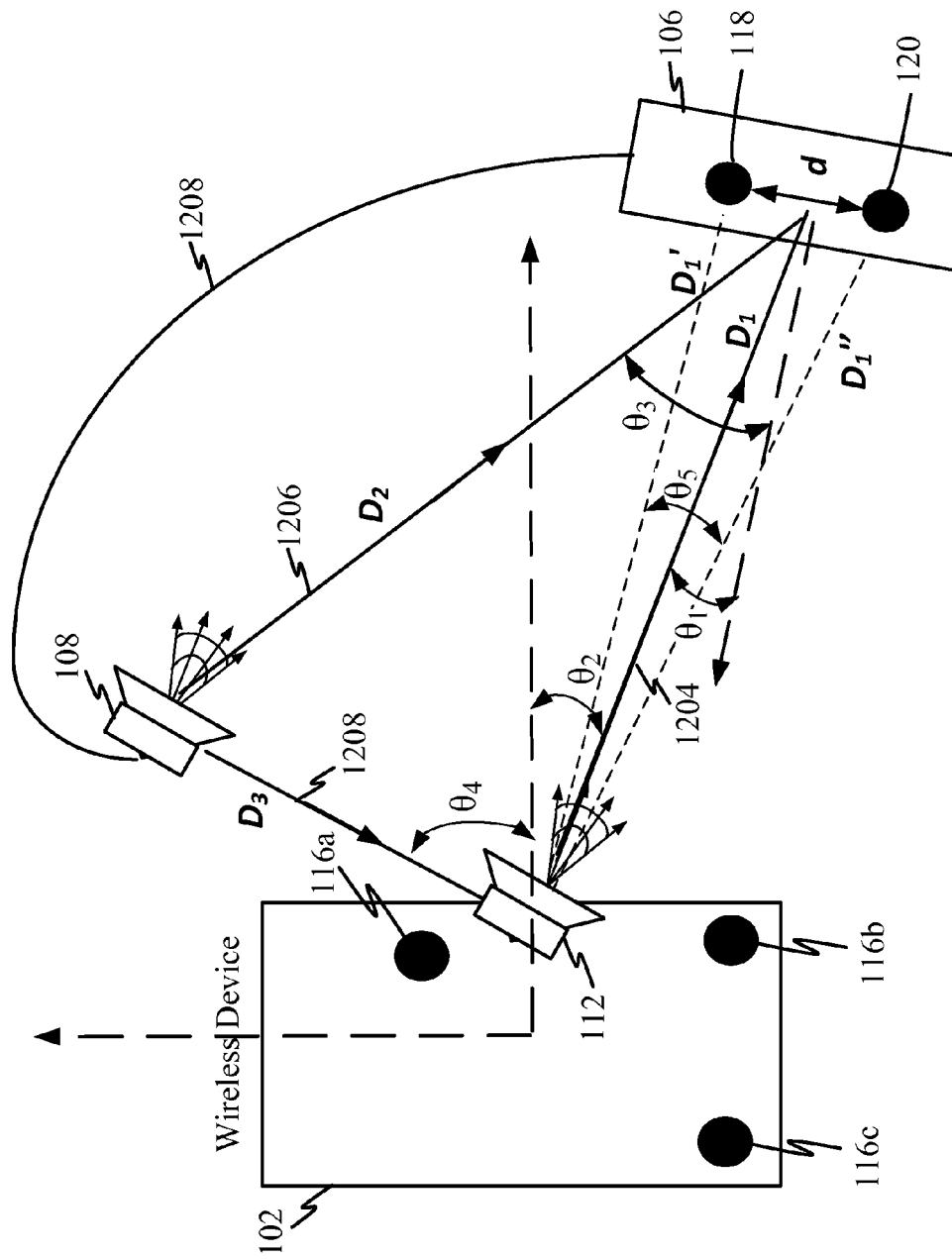

FIG. 12 illustrates another solution to ascertain a direction of arrival (denoted by angle $\theta_2$) relative to wireless device 102. This solution uses an external loudspeaker 108 wired (without delay or with a known/estimable delay) to the external device 106 to obtain the second direction of arrival (denoted by angle $\theta_2$). In this solution, a first sound/audio signal is emitted from the internal loudspeaker 112 and captured by the external microphones 118 and 120. That is, the wireless device 102 and external device 106 may be time synchronized so that audio transmissions are timestamped and the time of propagation or travel can be ascertained. The distance $D_1$ between the loudspeaker 112 and the external device 106 may be ascertainable based on a timestamp for the audio captured by the microphones 118 and 120. Since the velocity of sound is known, the distance $D_1$ can be ascertained (i.e., $D_1$=sound velocity×propagation time). Here, the distance to the first microphone may be denoted as $D_1'$ and the distance to the second microphone may be denoted as $D_1''$. Similarly, the first direction of arrival 1204 (denoted by angle $\theta_1$) may be ascertained relative to the external device 106. Knowing the distance d and ascertaining the distances $D_1'$ and $D_1''$ to each microphone 118 and 120 permits ascertaining the first direction of arrival (i.e., angle $\theta_1$), e.g., $\theta_1 = \theta_5/2 = \arccos((D_1'^2 + D_1''^2 - d^2)/2 \times D_1' \times D_1'')$. The distance $D_1$ may be obtained as the average between distances $D_1'$ and $D_1''$ (i.e., $D_1 = ((D_1' + D_1'')/2)$. The wireless device 102 may cause the second loudspeaker 108 to emit a second sound/audio signal by sending a message, command, and/or the second sound/audio signal to the second loudspeaker 108 (e.g., via the communication interface 122 to the external device 106 and then to the external loudspeaker 108). Since the external loudspeaker 108 is physically coupled to the external device 106 (via a wire 1208), it may be assumed that there is no time delay (or such delay is relatively insignificant) from the time the external device 106 sends the second sound/audio signal via the wire 1208 and the time that the second sound/audio signal is emitted by the loudspeaker 108. Thus, the distance $D_2$ between the loudspeaker 108 and the external device 106 may be ascertainable by measuring the delay from the time the second sound/audio signal is emitted to the time it is captured by the microphones 118 and 120 (similar to how distance $D_1$ is ascertained). The angle $\theta_3$ (denoting the angle of the second direction of arrival relative to the external device 106) may be ascertained (similar to how angle $\theta_1$ is ascertained) by obtaining the second direction of arrival from the external loudspeaker 108 to the external device 106 by using the microphones 118 and 120 and knowing the distance d between the microphones. Similarly, the angle $\theta_4$ may be ascertainable by obtaining a third direction of arrival 1208 from the external loudspeaker 108 to the wireless device 102 (e.g., the second audio/sound signal emitted by the external loudspeaker 108 and captured by the wireless device microphone(s) 116a, 116b, and/or 116c). Knowing the distances $D_1$ and $D_2$, and the angle $\theta_3 - \theta_1$ and $\theta_4$, the distance $D_3$ (between loudspeaker 112 and loudspeaker 108) and angle $\theta_2$ may be obtained which provides a location of the external device 106 relative to the wireless device 102. In particular, distance D3 may be ascertained as:

$$D_3 = \sqrt{D_1^2 + D_2^2 - 2 * D_1 * D_2 \cos(\theta_3 - \theta_1)}.$$

Then, angle $\theta_2$ may be ascertained as:

$$\theta_2 = \arccos\left(\frac{D_3^2 + D_1^2 - D_2^2}{2 * D_1 * D_3}\right) - \theta_4.$$

Figure 13:
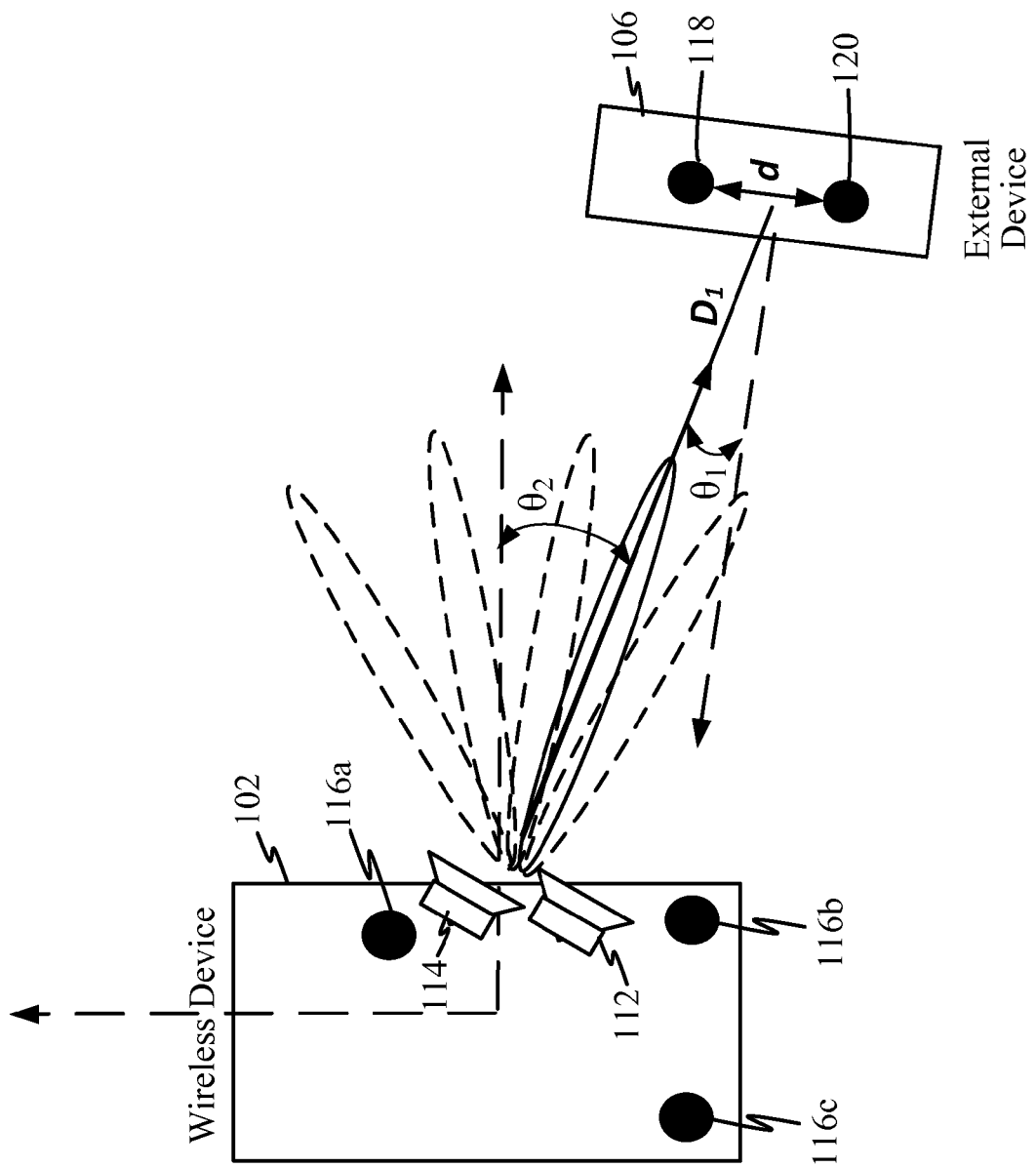

FIG. 13 illustrates another solution to ascertain a direction of arrival (denoted by angle $\theta_2$) relative to wireless device 102. Here, the wireless device 102 may use its multiple loudspeakers 112 and 114 to generate/emit beamed (focused) audio signals which may be captured by the microphones 118 and 120 of the external device 106. The wireless device 102 may emit a focused/beamed audio/sound signal (using the multiple loudspeakers 112 and 114) at various angles (e.g., sweeps through different angles). The angle that delivers the maximum energy (as ascertained from the captured beamed/focused audio/sound signals) at the external microphones 118 and 120 is selected. The angle for the selected beamed/focused audio signal with maximum energy is denoted as angle $\theta_2$. In this example, distance $D_1$ and angle $\theta_1$ may be ascertained as discussed with regard to FIG. 12. Since the wireless device 102 knows the angle of each beamed (focused) audio signal it generates relative to its own axis, it knows angle $\theta_2$ from the received signal energy reported by the external device 106.

In an alternative implementation, stereo cameras on the wireless device 102 may be used to identify the location of the external device (e.g., via object recognition) and thereby obtain the angle $\theta_2$.

Figure 14:
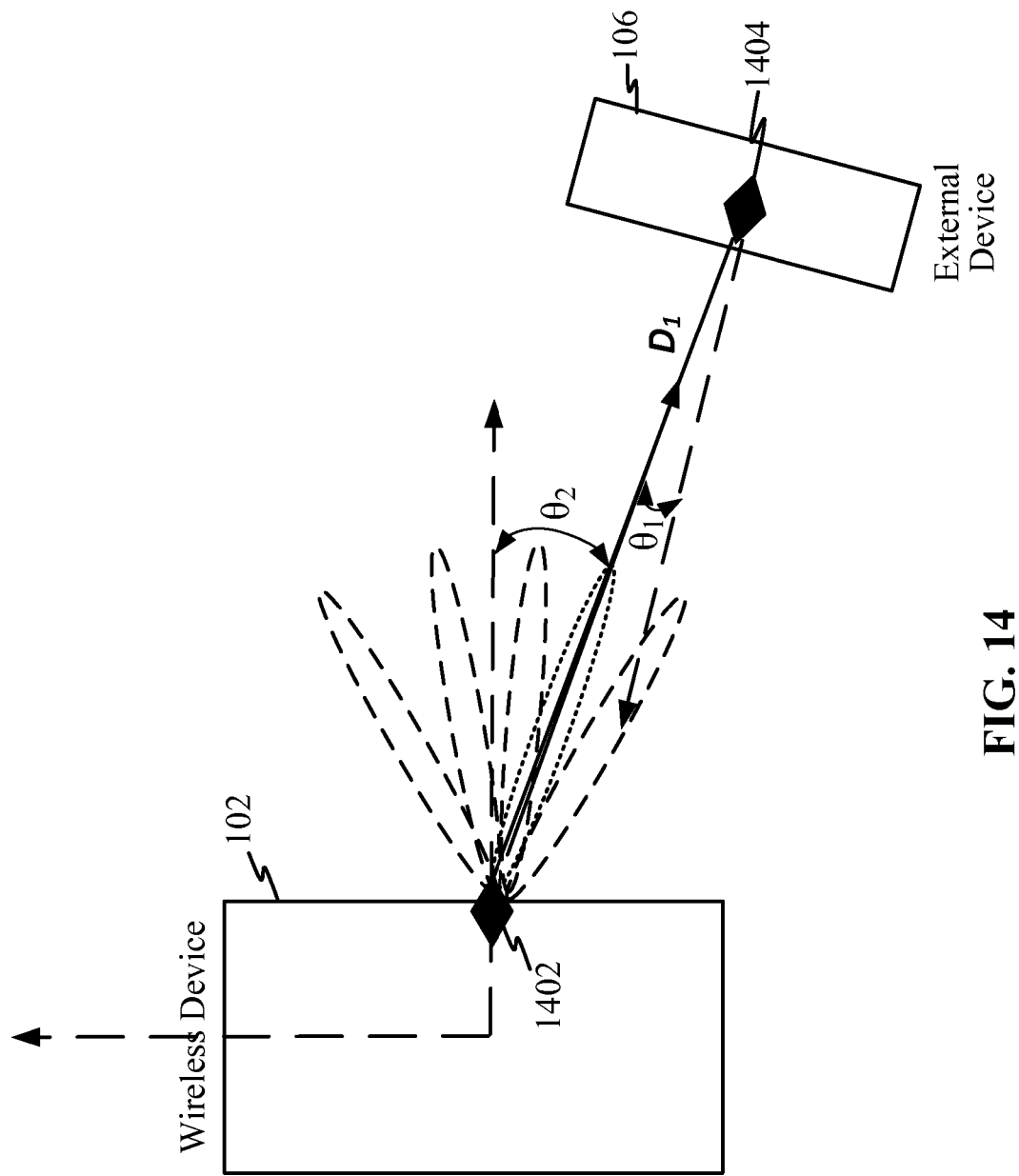

FIG. 14 illustrates another solution to ascertain a direction of arrival (denoted by angle $\theta_2$) relative to wireless device 102. In this example, the wireless device and/or external device 106 may be provisioned with a directional transmitter/receiver pair 1402 and 1404 which are used, instead of loudspeaker(s) and microphone(s), to ascertain a location/position of the external device 106 relative to the wireless device 102. For instance, a directional transmitter 104 may generate a directional signal (e.g., infrared, ultrasound, electromagnetic, etc.) which is emitted at various angles (e.g., swept across various angles). The receiver 1404 detects at which angle the maximum energy is sensed for the directional signals and this angle $\theta_2$ is selected.

Having ascertained the location of the external device 106 relative to the wireless device 102, locations for distributed transducers (e.g., loudspeakers and/or microphones) and a target user may be obtained by using both the wireless device 102 and external device 106 together.

Figure 15:
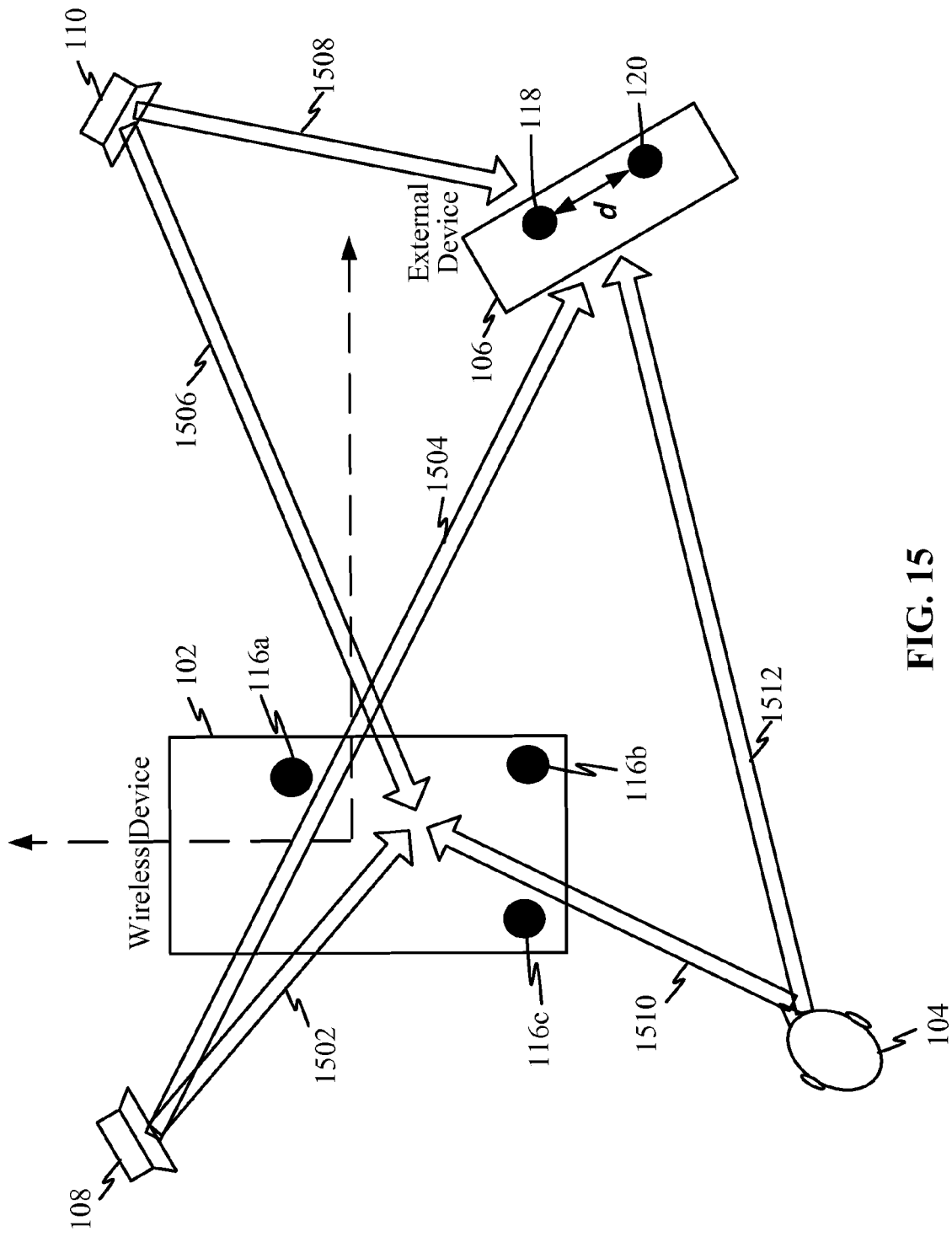
FIG. 15 illustrates how locations of distributed transducers and/or a target user relative to the wireless device may be obtained.

FIG. 15 illustrates how locations of distributed transducers and/or a target user relative to the wireless device may be obtained. For instance, the location(s) of external loudspeakers 108 and 110 may be ascertained by having each loudspeaker emit a sound/audio signal that is captured by one or more microphones on the wireless device 102 and/or the external device 106 and triangulating to estimate or obtain a location. For instance, the first external loudspeaker 108 may result in a first direction of arrival 1502 (to the wireless device 102) and a second direction of arrival (to the external device 106). Similarly, the second external loudspeaker 110 may result in a third direction of arrival 1506 (to the wireless device 102) and a fourth direction of arrival (to the external device 106). Because the location of the external device 106 relative to the wireless device 102 has been determined, the location of the loudspeakers 108 and/or 110 relative to the wireless device 102 is ascertainable. Similarly, the location of the target user 104 is ascertainable by capturing an audio/sound signal from the target user 104 at the wireless device 102 (fifth direction of arrival 1510) and the external device 106 (sixth direction of arrival 1512).

Exemplary Wireless Device

Figure 16:
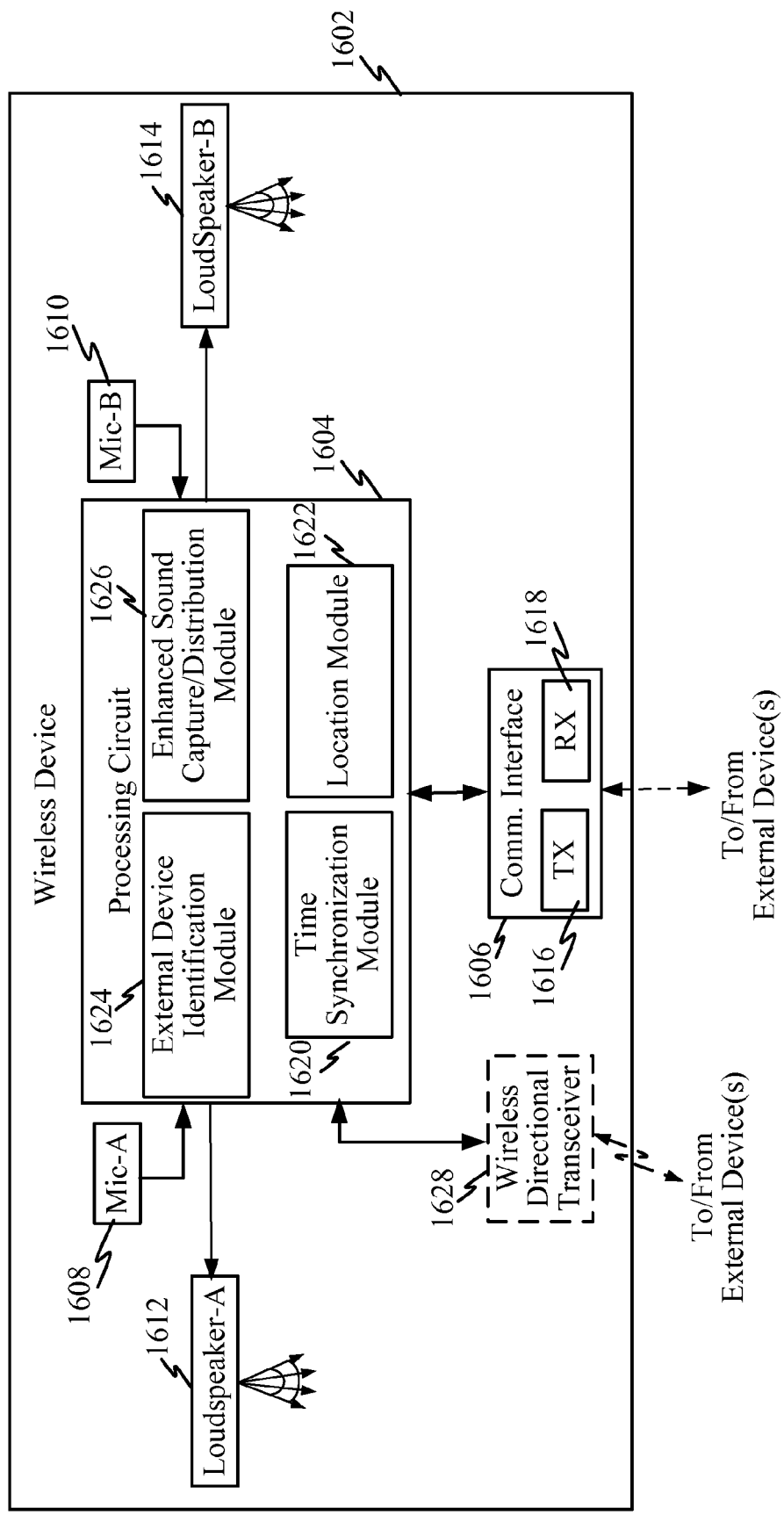
FIG. 16 is a block diagram illustrating a wireless device adapted to ascertain the relative location of one or more external devices and/or a target user to provide focused audio distribution and/or capture for the target user.

FIG. 16 is a block diagram illustrating a wireless device adapted to ascertain the relative location of one or more external devices and/or a target user to provide focused audio distribution and/or capture for the target user. In one example, the wireless device 1602 may include a processing circuit 1604 coupled to a communication interface 1606 and one or more audio transducers. The communication interface 1606 may include a transmitter circuit 1616 and/or receiver circuit 1618 that permit sending and/or receiving non-audible signals, such as digital/analog messages, commands, encoded audio, etc., to one or more external devices (e.g., from external microphones, to external loudspeakers, etc.). The audio transducers may include, for example, one or more integrated/external microphones 1608 and 1610 and/or loudspeakers 1612 and 1614.

The processing circuit 1604 may include or implement one or more processors, application specific processors, hardware and/or software modules, etc., that are adapted to perform enhancement of audio capture and/or delivery to a target user. For example, a time synchronization module 1620 may be adapted to synchronize the clocks for one or more external devices (e.g., microphones, loudspeakers) with a clock from the wireless device 1602. This may allow an external device to timestamp a captured audio signal (e.g., captured by an external microphone) sent by the wireless device 1602 (e.g., emitted by one or more loudspeakers 1612 and 1614), thereby allowing the wireless device 1602 to ascertain the time of propagation for the audio signal, and consequently, a distance between the wireless device 1602 and the external device. An external device identification module 1624 may allow the wireless device 1602 to search and/or query external devices (e.g., loudspeakers and/or microphones), e.g., via the communication interface 1606, to ascertain the presence of such external devices in its vicinity. A location module 1622 may be adapted to locate and/or map one or more external devices and/or one or more target users relative to the wireless device 1602. For example, once one or more external devices (e.g., microphones and/or loudspeakers) have been identified (e.g., by the external device identification module 1624), the location module 1602 may perform one or more algorithms, as illustrated in FIGS. 2-15), to locate the external devices and/or target user(s) relative to the wireless device 1602. An enhanced sound capture and/or distribution module 1626 may be adapted to use the external device and/or target user location information obtained by the location module 1622 to then provide enhanced audio/sound capture and/or audio/sound distribution to one or more target users. For instance, having located a target user and one or more external microphones, the enhanced sound capture/distribution module 1622 may select one or more microphones that best capture the target user's voice. For instance, microphones located in front of the target user may be selected. Similarly, to enhance audio delivery to the target user, loudspeakers located closest to and/or around the target user may be selected to play back audio/sound to the target user. Note that the wireless device 1602 is adapted (e.g., via the enhanced sound capture/distribution module 1622) to selectively receive captured audio from one or more internal and/or external microphones. For instance, audio/sound captured by external microphones may be received by the wireless device 1602 via the communication interface 1606. Such captured audio/sound may be timestamped (either by the external device sending it or by the wireless device) and/or associated with the capturing microphone. Similarly, audio/sound signals may be transmitted to one or more external loudspeakers via the communication interface 1606 by the wireless device 1602 such that the audio/sound may be focused or beamed to a target user. Knowing the relative location of the target user, the enhanced sound capture/distribution module 1622 may select one or more internal and/or external loudspeakers to emit focused/beamed audio to the target user.

In one optional implementation, the wireless device 1602 may also include a wireless directional transceiver 1628 that may serve to locate external devices as illustrated in FIG. 14, for example.

Figure 17:
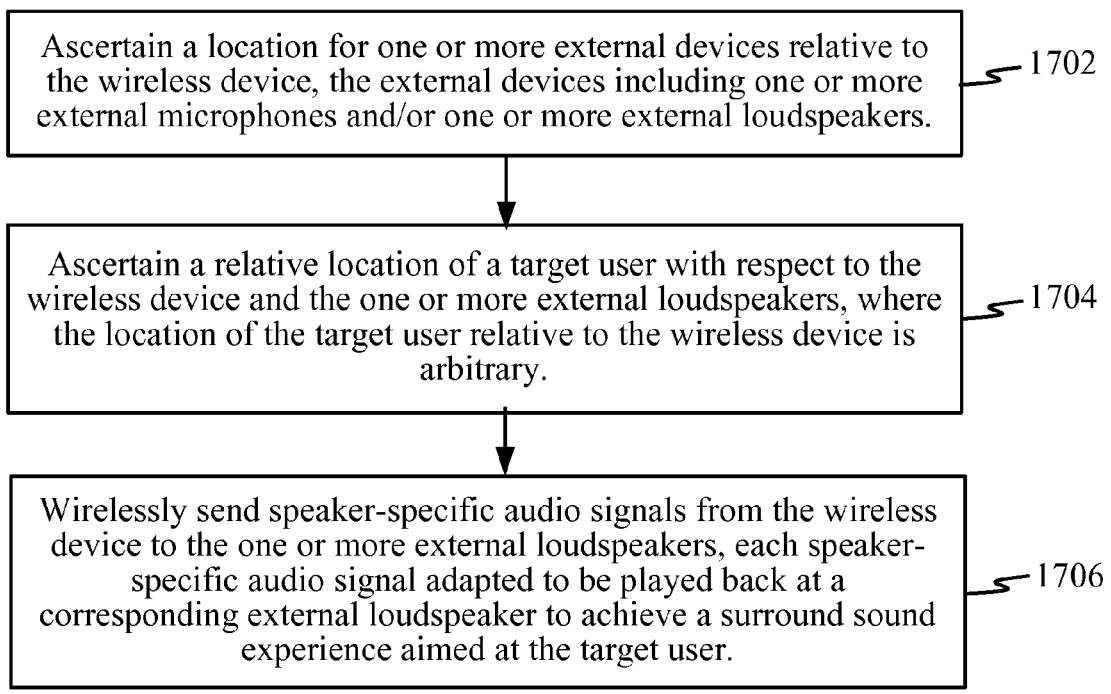
FIG. 17 illustrates a method operational in a wireless device to locate one or more nearby external devices and/or a target user and use this information to provide enhanced audio/sound capture and/or delivery to the target user.

FIG. 17 illustrates a method operational in a wireless device to locate one or more nearby external devices and/or a target user and use this information to provide enhanced audio/sound capture and/or delivery to the target user. Note that, in one example, the wireless device may perform external device location and/or enhanced audio/sound capture and/or delivery dynamically, automatically, and/or autonomously, without the user initiating such actions, without user interaction, and/or without prior knowledge of external device and/or target user location(s).

The wireless device may ascertain a location for one or more external devices relative to the wireless device, the external devices including one or more microphones and/or one or more loudspeakers 1702. The wireless device may then ascertain a relative location of a target user with respect to the wireless device and the one or more external loudspeakers, where the location of the target user relative to the wireless device is arbitrary (or previously unknown) 1704. For instance, the wireless device may select one or more external microphones from the one or more external devices and utilize them (along with perhaps one or more internal microphones) to capture audio from the target user to ascertain the relative location of the target user with respect to the wireless device. Having ascertained a target user location, the wireless device may wirelessly send speaker-specific audio signals to the one or more external loudspeakers, each speaker-specific audio signal adapted to be played back at a corresponding external loudspeaker to achieve a surround sound experience aimed at the target user 1706.

Figure 18:
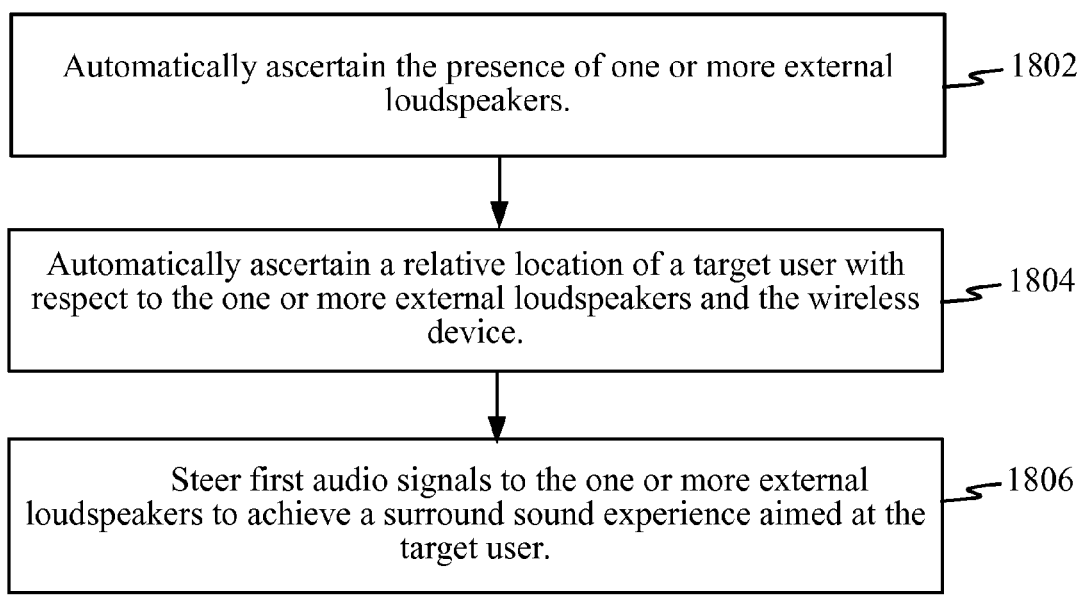
FIG. 18 illustrates yet another method operational in a wireless device to locate one or more nearby external devices and/or a target user and use this information to provide enhanced audio/sound capture and/or delivery to the target user.

FIG. 18 illustrates yet another method operational in a wireless device to locate one or more nearby external devices and/or a target user and use this information to provide enhanced audio/sound capture and/or delivery to the target user.

The wireless device may be configured to automatically ascertain the presence of one or more external loudspeakers 1802. Then the wireless device may automatically ascertain a relative location of a target user with respect to the one or more external loudspeakers and the wireless device 1804. With this relative information available, the wireless device may steer first audio signals to the one or more external loudspeakers to achieve a surround sound experience aimed at the target user 1806.

The wireless device may also automatically ascertain the presence of one or more external microphones. The wireless device may then (a) instruct the one or more external microphones to capture second audio signals from the one or more external loudspeakers to ascertain one or more corresponding directions of arrival for the captured second audio signals; and/or (b) instruct the one or more external microphones to capture a third audio signal from the target user to ascertain a direction of arrival for the captured third audio signal. The relative location of the target user with respect to the one or more external loudspeakers may be ascertained based on the directions of arrival.

Exemplary External Device

Figure 19:
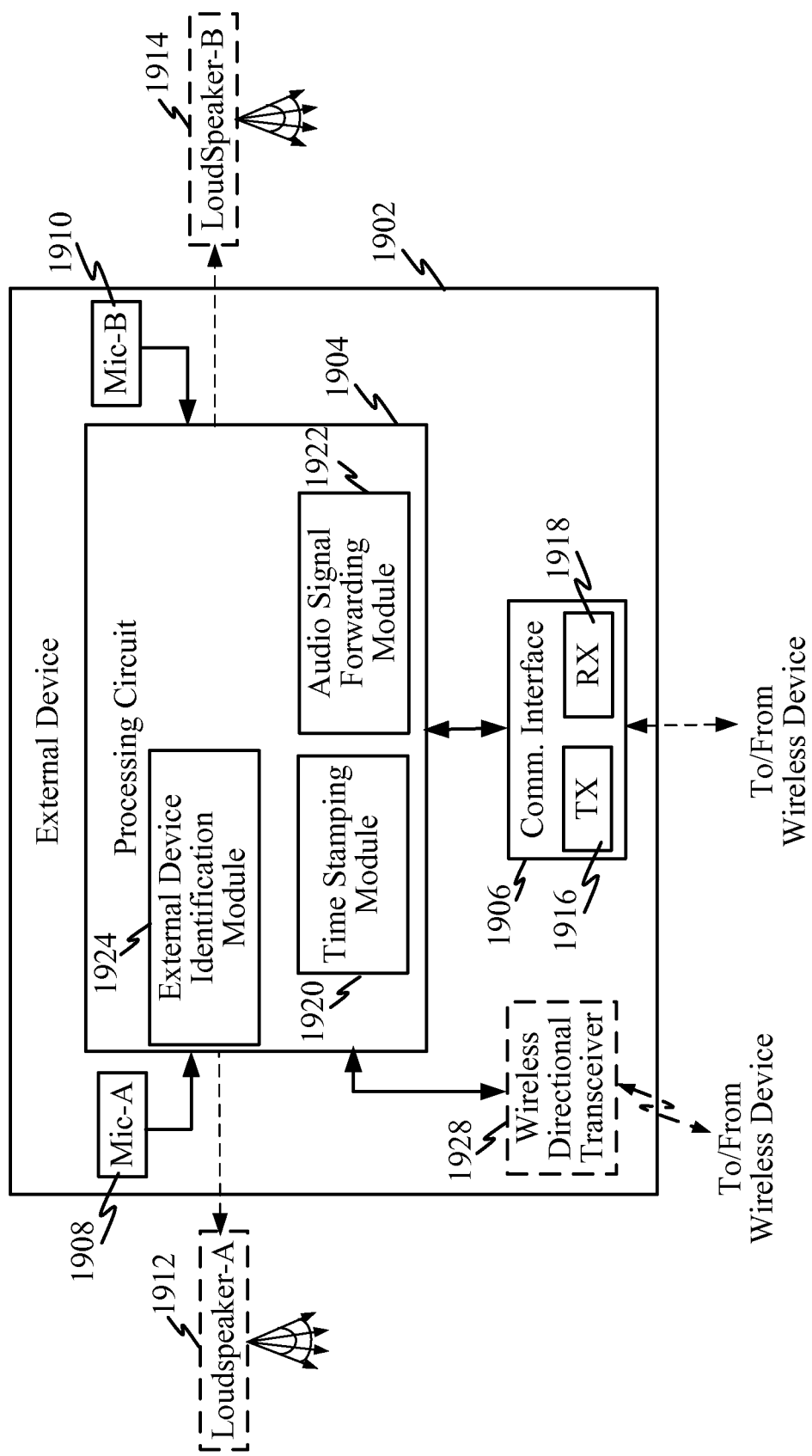
FIG. 19 is a block diagram illustrating an external device adapted to assist a wireless device in ascertaining the relative location of a target user to provide focused audio distribution and/or capture for the target user.

FIG. 19 is a block diagram illustrating an external device adapted to assist a wireless device in ascertaining the relative location of a target user and to provide focused audio distribution and/or capture for the target user. In one example, the external device 1902 may include a processing circuit 1904 coupled to a communication interface 1906 and one or more audio transducers. The communication interface 1906 may include a transmitter circuit 1916 and/or receiver circuit 1918 that permit sending and/or receiving non-audible signals, such as digital/analog messages, commands, encoded audio, etc., to a wireless device (e.g., from external microphones, to external loudspeakers, etc.). The audio transducers may include, for example, one or more integrated/external microphones 1908 and 1910 and/or loudspeakers 1912 and 1914.

The processing circuit 1904 may include or implement one or more processors, application specific processors, hardware and/or software modules, etc., that are adapted to assist the wireless device in enhancing audio capture and/or delivery to a target user. For example, a time synchronization module 1920 may be adapted to synchronize a clock for the external device 1902 with a clock from the wireless device. This may allow an external device to timestamp a captured audio signal (e.g., captured by microphone(s) 1908 and/or 1910) sent by the wireless device, thereby allowing the wireless device to ascertain the time of propagation for the audio signal, and consequently, a distance between the wireless device and the external device 1902. An external device identification module 1924 may allow the wireless device to search and/or query the external device 1902 (e.g., loudspeakers and/or microphones), e.g., via the communication interface 1906, to ascertain the presence of such external device 1902 in its vicinity. An audio signal forwarding module 1922 may be adapted to forward captured audio signals from the microphone(s) 1908 and/or 1910 to the wireless device. Additionally, the audio signal forwarding module 1922 may also be adapted to forward audio signals from the wireless device to the internal/external loudspeakers 1912 and 1914.

In one optional implementation, the external device 1902 may also include a wireless directional transceiver 1928 that may serve to locate the external device relative to the wireless device as illustrated in FIG. 14, for example.

Figure 20:
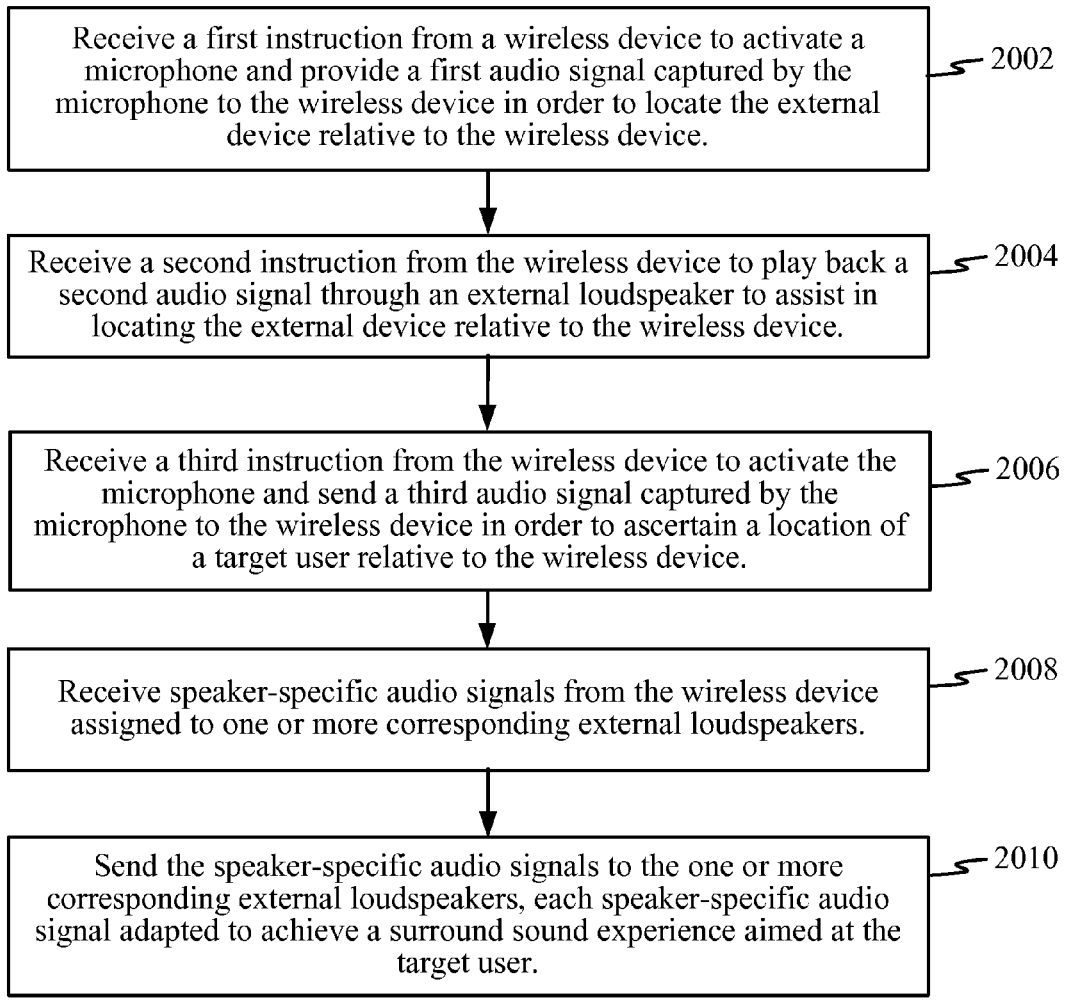
FIG. 20 illustrates a method operational in an external device to assist in wireless device in locating one or more nearby external devices and/or a target user and use this information to provide enhanced audio/sound capture and/or delivery to the target user.

FIG. 20 illustrates a method operational in an external device to assist in wireless device in locating one or more nearby external devices and/or a target user and use this information to provide enhanced audio/sound capture and/or delivery to the target user. The external device may receive a first instruction from a wireless device to activate a microphone and provide a first audio signal captured by the microphone to the wireless device in order to locate the external device relative to the wireless device 2002. It may also receive a second instruction from the wireless device to play back a second audio signal through an external loudspeaker to assist in locating the external device relative to the wireless device 2004. Additionally, the external device may receive a third instruction from the wireless device to activate the microphone and send a third audio signal captured by the microphone to the wireless device in order to ascertain a location of a target user relative to the wireless device 2006.

Subsequently, the external device may receive speaker-specific audio signals from the wireless device assigned to one or more corresponding external loudspeakers 2008. As a result, the external device may send the speaker-specific audio signals to the one or more corresponding external loudspeakers, each speaker-specific audio signal adapted to achieve a surround sound experience aimed at the target user 2010.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing embodiments described herein, is considered a special purpose processor for carrying out such embodiments. Similarly, a general-purpose computer is considered a special purpose computer when configured for carrying out embodiments described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a wireless device, comprising:
ascertaining a relative location of a target user with respect to the wireless device and a relative location of one or more external loudspeakers with respect to the wireless device, where the location of the target user relative to the wireless device is arbitrary, wherein ascertaining the relative location of the target user with respect to the wireless device comprises capturing audio signals from the target user, and wherein ascertaining the relative location of the one or more external loudspeakers with respect to the wireless device comprises obtaining information indicative of a location of one or more external devices relative to the wireless device, the information being based on an emitted audio signal that is emitted by the wireless device; and
wirelessly sending speaker-specific audio signals from the wireless device to the one or more external loudspeakers, the speaker-specific audio signals being based on the relative location of the target user with respect to the wireless device and the relative location of the one or more external loudspeakers with respect to the wireless device, each speaker-specific audio signal adapted to be played back at a corresponding external loudspeaker to achieve a surround sound experience aimed at the target user.

2. The method of claim 1, further comprising:
ascertaining the location for the one or more external devices relative to the wireless device, the one or more external devices including one or more external microphones and/or the one or more external loudspeakers.

3. The method of claim 2, wherein the audio signals from the target user are captured using one or more internal microphones.

4. The method of claim 3, wherein ascertaining the relative location of the target user with respect to the wireless device further comprises comparing captured audio from each of the one or more external microphones.

5. The method of claim 3, further comprising:
instructing the one or more external devices to cause the one or more external microphones to capture the audio signals from the target user to ascertain a direction of arrival for the captured audio signals from the target user.

6. The method of claim 2, wherein ascertaining the location for the one or more external devices relative to the wireless device comprises:
instructing the one or more external devices to cause the one or more external microphones to capture audio signals from the one or more external loudspeakers to ascertain one or more corresponding directions of arrival for the captured audio signals from the one or more external loudspeakers.

7. The method of claim 1, wherein ascertaining the relative location of the target user with respect to the wireless device includes:
ascertaining a location of the target user relative to an external device.

8. The method of claim 1, wherein the wireless device is a mobile telephone device.

9. The method of claim 1, wherein the speaker-specific audio signals from the wireless device to the one or more external loudspeakers are sent in inaudible form via a wireless communication interface.

10. A wireless device, comprising:
a communication interface to communicate with one or more local external devices; and
a processing circuit coupled to the communication interface, the processing circuit adapted to:
ascertain a relative location of a target user with respect to the wireless device and a relative location of one or more external loudspeakers with respect to the wireless device, where the location of the target user relative to the wireless device is arbitrary, wherein ascertaining the relative location of the target user with respect to the wireless device comprises capturing audio signals from the target user, and wherein ascertaining the relative location of the one or more external loudspeakers with respect to the wireless device comprises obtaining information indicative of a location of one or more external devices relative to the wireless device, the information being based on an emitted audio signal that is emitted by the wireless device; and
wirelessly send speaker-specific audio signals from the wireless device to the one or more external loudspeakers, the speaker-specific audio signals being based on the relative location of the target user with respect to the wireless device and the relative location of the one or more external loudspeakers with respect to the wireless device, each speaker-specific audio signal adapted to be played back at a corresponding external loudspeaker to achieve a surround sound experience aimed at the target user.

11. The wireless device of claim 10, further comprising:
one or more internal microphones which are also used to locate the target user relative to the wireless device; and
one or more internal loudspeakers which are also used to provide speaker-specific audio signals aimed at the target user.

12. The wireless device of claim 10, wherein the processing circuit is further adapted to:
ascertain the location for the one or more external devices relative to the wireless device, the one or more external devices including one or more external microphones and/or the one or more external loudspeakers.

13. The wireless device of claim 12, wherein the audio signals from the target user are captured using one or more internal microphones.

14. The wireless device of claim 10, wherein ascertaining the relative location of the target user with respect to the wireless device includes:
ascertaining a location of the target user relative to an external device.

15. The wireless device of claim 10, wherein the wireless device is a mobile telephone device.

16. The wireless device of claim 10, wherein the speaker-specific audio signals from the wireless device to the one or more external loudspeakers are sent in inaudible form via a wireless communication interface.

17. A wireless device, comprising:
means for communicating with one or more local external devices;
means for ascertaining a relative location of a target user with respect to the wireless device and a relative location of one or more external loudspeakers with respect to the wireless device, where the location of the target user relative to the wireless device is arbitrary, wherein the means for ascertaining the relative location of the target user with respect to the wireless device comprises means for capturing audio signals from the target user, and wherein the means for ascertaining the relative location of the one or more external loudspeakers with respect to the wireless device comprises means for obtaining information indicative of a location of one or more external devices relative to the wireless device, the information being based on an emitted audio signal that is emitted by the wireless device; and
means for wirelessly sending speaker-specific audio signals from the wireless device to the one or more external loudspeakers, the speaker-specific audio signals being based on the relative location of the target user with respect to the wireless device and the relative location of the one or more external loudspeakers with respect to the wireless device, each speaker-specific audio signal adapted to be played back at a corresponding external loudspeaker to achieve a surround sound experience aimed at the target user.

18. The wireless device of claim 17, further comprising:
means for ascertaining the location for the one or more external devices relative to the wireless device, the one or more external devices including one or more external microphones and/or the one or more external loudspeakers.

19. A non-transitory processor-readable medium having instructions stored thereon, which when executed by one or more processors causes the one or more processors to: ascertain a relative location of a target user with respect to a wireless device and a relative location of one or more external loudspeakers with respect to the wireless device, where the location of the target user relative to the wireless device is arbitrary, wherein ascertaining the relative location of the target user with respect to the wireless device comprises capturing audio signals from the target user, and wherein ascertaining the relative location of the one or more external loudspeakers with respect to the wireless device comprises obtaining information indicative of a location of one or more external devices relative to the wireless device, the information being based on an emitted audio signal that is emitted by the wireless device; and wirelessly send speaker-specific audio signals from the wireless device to the one or more external loudspeakers, the speaker-specific audio signals being based on the relative location of the target user with respect to the wireless device and the relative location of the one or more external loudspeakers with respect to the wireless device, each speaker-specific audio signal adapted to be played back at a corresponding external loudspeaker to achieve a surround sound experience aimed at the target user.

20. The non-transitory processor-readable medium of claim 19, further having instructions stored thereon, which when executed by one or more processors causes the one or more processors to: ascertain the location for the one or more external devices relative to the wireless device, the one or more external devices including one or more external microphones and/or the one or more external loudspeakers.

21. A wireless device, comprising:
a communication interface to communicate with one or more local external devices; and
a processing circuit coupled to the communication interface, the processing circuit adapted to:
ascertain the presence of one or more external loudspeakers;
ascertain a relative location of a target user with respect to the one or more external loudspeakers;
ascertain a relative location of the one or more external loudspeakers with respect to the wireless device;
steer first audio signals to the one or more external loudspeakers to achieve a surround sound experience aimed at the target user; and
instruct the one or more local external devices to cause one or more external microphones to capture second audio signals from the one or more external loudspeakers to ascertain one or more corresponding directions of arrival for the captured second audio signals;
wherein ascertaining the relative location of the target user with respect to the one or more external loudspeakers is based at least in part on the one or more corresponding directions of arrival for the captured second audio signals; and
wherein ascertaining the relative location of the one or more external loudspeakers with respect to the wireless device comprises obtaining information indicative of a location of the one or more local external devices relative to the wireless device, the information being based on an emitted audio signal that is emitted by the wireless device.

22. The wireless device of claim 21, wherein the processing circuit is further adapted to:
ascertain the presence of the one or more external microphones; and
instruct the one or more local external devices to cause the one or more external microphones to capture a third audio signal from the target user to ascertain a direction of arrival for the captured third audio signal;
wherein ascertaining the relative location of the target user with respect to the one or more external loudspeakers is also based on the direction of arrival for the captured third audio signal.

23. The wireless device of claim 21, further comprising:
one or more internal microphones which are also used to locate the target user relative to the wireless device; and
one or more internal loudspeakers which are also used to steer the first audio signals aimed at the target user.

24. The wireless device of claim 21, wherein the processing circuit is further adapted to:
steer the first audio signals to one or more internal loudspeakers to achieve the surround sound experience aimed at the target user.

25. A wireless device, comprising:
means for ascertaining the presence of one or more external loudspeakers;
means for ascertaining a relative location of a target user with respect to the one or more external loudspeakers;
means for ascertaining a relative location of the one or more external loudspeakers with respect to the wireless device;
means for steering first audio signals to the one or more external loudspeakers to achieve a surround sound experience aimed at the target user; and
means for instructing one or more external devices to cause one or more external microphones to capture second audio signals from the one or more external loudspeakers to ascertain one or more corresponding directions of arrival for the captured second audio signals;
wherein ascertaining the relative location of the target user with respect to the one or more external loudspeakers is based at least in part on the one or more corresponding directions of arrival for the captured second audio signals; and
wherein the means for ascertaining the relative location of the one or more external loudspeakers with respect to the wireless device comprises means for obtaining information indicative of a location of the one or more external devices relative to the wireless device, the information being based on an emitted audio signal that is emitted by the wireless device.

26. The wireless device of claim 25, further comprising:
means for ascertaining the presence of the one or more external microphones; and
means for instructing the one or more external devices to cause the one or more external microphones to capture a third audio signal from the target user to ascertain a direction of arrival for the captured third audio signal;
wherein ascertaining the relative location of the target user with respect to the one or more external loudspeakers is also based on the direction of arrival for the captured third audio signal.

27. A non-transitory processor-readable medium having instructions stored thereon, which when executed by one or more processors causes the one or more processors to: ascertain the presence of one or more external loudspeakers; ascertain a relative location of a target use with respect to the one or more external loudspeakers; ascertain a relative location of the one or more external loudspeakers with respect to a wireless device; steer first audio signals to the one or more external loudspeakers to achieve a surround sound experience aimed at the target user; and instruct one or more external devices to cause one or more external microphones to capture second audio signals from the one or more external loudspeakers to ascertain one or more corresponding directions of arrival for the captured second audio signals; wherein ascertaining the relative location of the target user with respect to the one or more external loudspeakers is based at least in part on the one or more corresponding directions of arrival for the captured second audio signals; and wherein ascertaining the relative location of the one or more external loudspeakers with respect to the wireless device comprises obtaining information indicative of a location of one or more external devices relative to the wireless device, the information being based on an emitted audio signal that is emitted by the wireless device.

28. The non-transitory processor-readable medium of claim 27, further having instructions stored thereon, which when executed by one or more processors causes the one or more processors to: ascertain the presence of the one or more external microphones; and instruct the one or more external devices to cause the one or more external microphones to capture a third audio signal from the target user to ascertain a direction of arrival for the captured third audio signal; wherein ascertaining the relative location of the target user with respect to the one or more external loud speakers is also based on the direction of arrival for the captured third audio signal.

* * * * *